(12) United States Patent
Kleen et al.

(10) Patent No.: US 10,332,258 B2
(45) Date of Patent: Jun. 25, 2019

(54) METHOD AND APPARATUS FOR PROCESSING GRAPHICS

(71) Applicant: ARM Limited, Cambridge (GB)

(72) Inventors: Amir Kleen, Cambridge (GB); Peter William Harris, Cambridge (GB); David James Bermingham, Royston (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/479,280

(22) Filed: Apr. 5, 2017

(65) Prior Publication Data
US 2017/0309027 A1    Oct. 26, 2017

(30) Foreign Application Priority Data

Apr. 22, 2016  (GB) .................................. 1607027.8

(51) Int. Cl.
*G06T 7/11* (2017.01)
*G06T 1/20* (2006.01)
(Continued)

(52) U.S. Cl.
CPC ................. *G06T 7/11* (2017.01); *G06T 1/20* (2013.01); *G06T 1/60* (2013.01); *G06T 11/40* (2013.01); *G06T 17/20* (2013.01); *G06T 2207/20021* (2013.01); *G06T 2210/12* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 6,882,345 B2* | 4/2005 | Movshovich | G06T 15/005 345/421 |
| 2014/0139534 A1* | 5/2014 | Tapply | G06T 11/40 345/522 |
| 2014/0267256 A1* | 9/2014 | Heggelund | G06T 15/40 345/421 |

FOREIGN PATENT DOCUMENTS

| | | |
|---|---|---|
| GB | 2433014 | 6/2007 |
| GB | 2467049 | 7/2010 |
| GB | 2509822 | 7/2014 |

OTHER PUBLICATIONS

GB Search Report dated Oct. 6, 2016, GB Patent Application GB1607027.8.

* cited by examiner

*Primary Examiner* — Said Broome
(74) *Attorney, Agent, or Firm* — Vierra Magen Marcus LLP

(57) ABSTRACT

A graphics processing system sorts graphics primitives for rendering into lists corresponding to different sub-regions of a render output to be generated, each list indicating primitives to be processed for the render output. A primitive list building unit divides a render target into various sub-regions, determines which sub-regions a primitive falls within and adds the primitive to the primitive lists corresponding to those sub-regions. The primitive list building unit also records the positions of the primitives in a pair of histograms which show the distribution of primitives across the render output. Once all primitives for the render output have been sorted into lists, the histograms are outputted to a predictor processor. The predictor processor then determines a set of sub-region sizes to be used when sorting primitives for the next render output to be generated into lists, based on the histograms.

16 Claims, 5 Drawing Sheets

(51) Int. Cl.
*G06T 17/20* (2006.01)
*G06T 11/40* (2006.01)
*G06T 1/60* (2006.01)

METHOD AND APPARATUS FOR PROCESSING GRAPHICS

BACKGROUND

The technology described herein relates to a method of and apparatus for processing graphics, and in particular to such a method and apparatus for use in a tile-based graphics processing system.

Graphics processing is normally carried out by first splitting the scene to be displayed into a number of similar basic components or "primitives", which primitives are then subjected to the desired graphics processing operations. The graphics "primitives" are usually in the form of simple polygons, such as triangles, and are usually described by defining their vertices.

Many graphics processing systems use so-called "tile-based" rendering. In tile-based rendering, the two-dimensional render output or target (i.e. the output of the rendering process, such as an output frame to be displayed) is rendered as a plurality of smaller area sub-regions, usually referred to as "tiles". The tiles are each rendered separately (typically one-after-another). The rendered tiles are then recombined to provide the complete rendering output (e.g. frame for display). In such arrangements, the render output (output) is typically divided (by area) into regularly-sized and shaped rendering tiles (they are usually e.g., squares or rectangles) but this is not essential.

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.

The advantage of such tile-based rendering is that primitives that do not appear in a given tile do not have to be processed for that tile, and therefore can be ignored when the tile is processed. This allows the overall amount of graphics processing necessary for a given render output to be reduced.

In a tile-based rendering system, it is accordingly usually desirable to be able to identify and know those primitives that are actually present in a given rendering tile so as to, e.g., avoid unnecessarily rendering primitives that are not actually present in a tile. In order to facilitate this, it is known to prepare for each rendering tile a list of the primitives to be rendered for that rendering tile (e.g. that will appear in the tile). Such a "primitive-list" (which can also be referred to as a "tile list") identifies (e.g. by reference to a primitive indicator) the primitives to be rendered for the tile in question.

The process of preparing primitive lists for each tile to be rendered basically involves determining the primitives that should be rendered for a given rendering tile. This process is usually carried out by determining (at a desired level of accuracy) the primitives that intersect (i.e. that will appear (at least in part) within) the tile in question, and then preparing a list of those primitives for future use by the graphics processing system. (It should be noted here that where a primitive falls into more than one tile (as will frequently be the case), it is included in the tile list for each tile that it falls within.) In effect, each tile can be considered to have a bin (the primitive-list) into which any primitive that is found to fall within (i.e. intersect) the tile is placed (and, indeed, the process of sorting the primitives on a tile-by-tile basis in this manner is commonly referred to as "binning").

The process of determining the primitives that should be listed (rendered) for any given rendering tile can be carried out at varying levels of precision, for example depending on efficiency optimisations for different parts of the tiling and rendering processes. For example, at the most precise level, it could be determined exactly which tiles a given primitive will appear at least in part in, and the primitive then included in the primitive lists for those tiles only. This is commonly referred to as "exact" binning.

It is also known to prepare primitive-lists with a lower precision than is achieved with exact binning. This can be useful to, e.g., simplify the preparation of the primitive-lists. One common "less precise" binning technique is "bounding box" binning. In this case, a so-called "bounding box" is drawn around a primitive or a set of primitives, and then the tiles covered by the bounding box are determined. The primitive or primitives that the bounding box represents (i.e. that are encompassed by the bounding box) are then listed (binned) for each tile that the bounding box has been found to cover (at least in part).

Once lists of primitives to be rendered (primitive-lists) have been prepared for each rendering tile in this way, the primitive-lists are stored for use, e.g., to allow the system to identify which primitives need to be considered (and rendered) when the tile in question is rendered.

Such tile-based rendering arrangements have been found to work well, as they can, for example, help to avoid primitives still being processed for regions of the render output where they are not present.

However, one drawback with the need to prepare and store primitive-lists identifying the primitives to be rendered for each tile is that depending on the distribution of the primitives for a given, e.g., frame to be rendered, the primitive-lists for different tiles to be used for the frame can be very different sizes, as can the primitive lists for tiles for different frames. This means that, e.g., a given render output or tile may have significantly different memory requirements for storing its primitive list(s) as compared to other tiles or render outputs.

The Applicants have accordingly already proposed in their UK Patent No. 2433014 an improved tile-based rendering system, which can prepare primitive lists both for single rendering tiles and (additionally or alternatively) for render output areas comprising more than one tile (i.e. primitive lists that encompass more than one rendering tile (and thereby, in effect, a larger area) of the output to be generated). In other words, as well as (or instead of) preparing lists of primitives that are exclusive to single rendering tiles only, primitive-lists that can and will be used for plural rendering tiles in common can be and are prepared.

As discussed in the Applicant's earlier patent, preparing different render output "area" primitive lists has a number of advantages, such as allowing the amount of memory that is used for the primitive lists to be varied, and facilitating better control over and knowledge of the memory usage requirements for the primitive listing process.

In the Applicant's earlier patent, the primitives are basically sorted into the primitive lists for different sized areas of the render output so as to limit the number of different primitive lists a given primitive will be listed in. This helps to control the amount of memory that will be needed for the primitive lists.

The Applicants believe there remains further scope for improvements in the primitive binning process, and in particular in selecting render output areas appropriate for use when preparing primitive lists.

BRIEF DESCRIPTION OF THE DRAWINGS

A number of embodiments of the technology described herein will now be described by way of example only and with reference to the accompanying drawings, in which.

DETAILED DESCRIPTION

Figure 1:
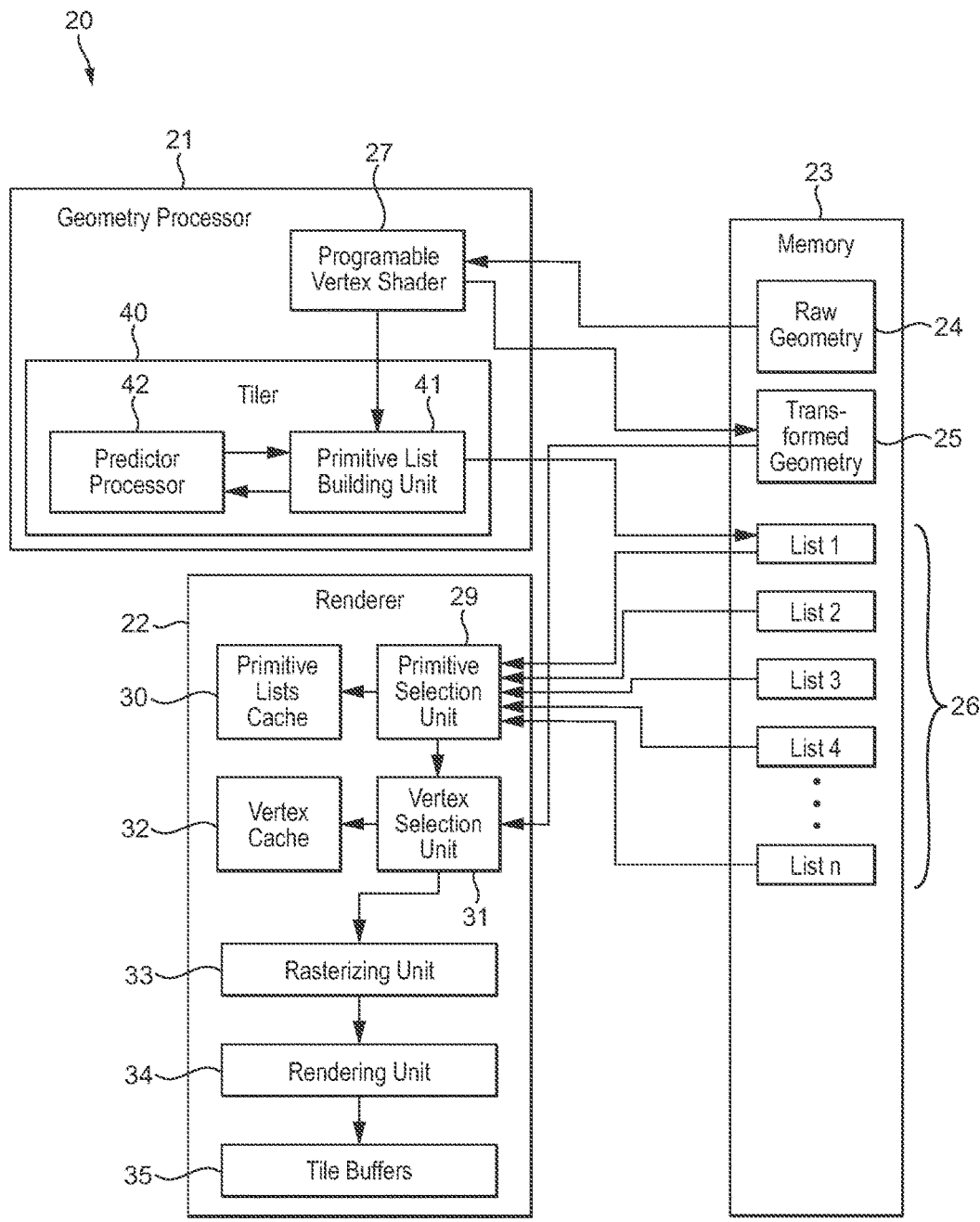
FIG. 1 shows schematically an embodiment of a graphics processing system that can operate in accordance with the technology described herein.

A first embodiment of the technology described herein comprises a method of sorting graphics primitives for rendering into lists representing different sub-regions of a render output to be generated in a graphics processing system, each list indicating primitives to be processed for the respective sub-region of the render output, the method comprising:

determining a size of at least one of the sub-regions of a first render output to be used when sorting primitives to be processed for the first render output into sub-region lists for the first render output based on a distribution of primitives across another render output generated by the graphics processing system.

A second embodiment of the technology described herein comprises a graphics processing system comprising:

primitive list processing circuitry configured to sort primitives for rendering into lists representing different sub-regions of a render output to be generated by the graphics processing system, each list indicating primitives to be processed for the respective sub-region of the render output; and predictor processing circuitry configured to determine a size of at least one of the sub-regions of a render output for the primitive list processing circuitry to use when sorting primitives to be processed for a first render output into lists, based on a distribution of primitives across another render output.

The technology described herein relates to a graphics processing system that uses primitive lists for plural sub-regions of a render output to be generated. However, in the technology described herein, the size of the render output sub-regions for which primitive lists are to be prepared for a given render output to be generated is selected, at least in part, based on how primitives are distributed across another render output that has been generated.

The Applicants have recognised that there can be a number of factors that can be affected by the size of sub-regions used when sorting primitives into lists. For example, it may be more effective from a memory capacity point of view to prepare primitive lists for relatively large sub-regions of a particular render output, since this means that a given primitive is only stored in a single list for a particular (large) sub-region, as opposed to, e.g., being stored in multiple lists for multiple smaller sub-regions that the primitive bounding box covers (e.g. sub-regions corresponding to a single tile size) encompassing the same area of the render output as the single larger sub-region.

On the other hand, however, preparing primitive lists for larger sub-regions may increase the number of times that a given primitive needs to be read from a list. A primitive stored in a list for a larger sub-region needs to be read from that list multiple times in use, as it will need to be read for each rendering tile that the larger sub-region covers, even if the primitive does not itself extend into all of those rendering tiles. This may therefore result in redundant reads of primitive for areas of the render output that the primitive does not directly cover.

The Applicants have also recognised in this regard that the sizes of the sub-regions that may be most desirable to use when preparing primitive lists for those sub-regions may be dependent on the distribution of primitives across the render output. In areas where there is a high density of (e.g. smaller) primitives, for example, it may be desirable to sort primitives into multiple lists for respective multiple smaller sub-regions that the primitives cover, as opposed to e.g. listing all primitives in a single list for a single larger sub-region. This is because in such areas with high densities of primitives, the cost in terms of memory capacity associated with storing multiple lists (for the multiple smaller sub-regions compared to a single list for a larger sub-region) may be outweighed by the benefit that that the total number of read commands is reduced compared to if only a single list for a single larger sub-region was used.

Conversely, in areas with a lower density of (e.g. larger) primitives, it may be beneficial to prepare primitive lists for larger sub-regions, since in these areas the benefits in terms of reduced memory capacity associated with storing less primitive lists may outweigh the cost associated with any increase in the total number of read commands for each rendering tile that the larger sub-region covers.

The Applicants have therefore recognised that the most preferable size of sub-region to use for particular regions of a render output when sorting primitives into lists may be dependent on the distribution of primitives across the render output.

The Applicants have therefore recognised that, when determining what size of sub-region to use when sorting primitives into lists, it would be beneficial to know or be able to predict what the distribution of primitives across the render output is likely to be, so that the sizes of sub-regions for which primitive lists are to be prepared can be chosen appropriately.

The Applicants have also recognised that it is often the case that the distribution of primitives across a particular render output is likely to be similar to, or even identical to, the distribution of primitives across another (e.g. a previously generated) render output. For example, if a static image is to be displayed across a particular area of a screen, then the distribution of primitives across the area of that static image is likely to be unchanged for all of the frames generated during the duration for which that static image is to be displayed. The Applicants have therefore recognised that the distribution of primitives across a first render output can often accordingly be predicted from the distribution of primitives across another render output (such as, for example, and in an embodiment, the previous render output (e.g. that was generated for the previous frame)).

The technology described herein takes account of the above by choosing what size of sub-regions to use when sorting primitives into lists for a particular render output to be generated based on the distribution of primitives across another (e.g. a previously generated) render output (e.g. the previous frame). In other words, the technology described herein, in effect, uses the distribution of primitives across one render output to predict what the distribution of primitives across the render output being generated is likely to be, and then uses this information to choose appropriate sub-region sizes for use when sorting primitives into lists when generating the current render output.

The Applicants have found that this can lead to significant savings in terms of, e.g. memory bandwidth and power consumption for the primitive listing (binning) and rendering process, compared to prior art systems.

The technology described herein is applicable to tile-based graphics processing systems, in which the rendering target (such as, e.g., a frame to be displayed) is divided into plural rendering tiles for rendering purposes (is processed on a tile-by-tile basis).

The tiles that the render output (target) is divided into for rendering purposes in the technology described herein can be any suitable and desired such tiles. The size and shape of the rendering tiles may depend, e.g., on the tile configuration that the graphics processor is configured to use and handle.

The rendering tiles are in an embodiment all the same size and shape (i.e. regularly-sized and shaped tiles are in an embodiment used), although this is not essential. The tiles are in an embodiment square or rectangular. The size and number of tiles can be selected as desired. In an embodiment, each tile is 16×16 or 32×32 sampling positions in size (with the render output then being divided into however many such tiles as are required for the render output size and shape that is being used).

The render output (target) sub-regions for which primitive lists can be prepared can be arranged and configured as desired.

The sizes of (at least some of) the render output sub-regions for which primitive lists may be prepared may be variable, in accordance with the technology described herein. The number of possible different sub-region sizes and shapes, as well as the sizes and shapes themselves, can be arranged and configured as desired.

In an embodiment, each render output sub-region for which primitive lists may be prepared forms a regularly-shaped area of the render output. The render output sub-regions are in an embodiment rectangular (or square). However more irregular shapes, such as, e.g., an "L"-shaped or triangular shaped sub-region(s) could also be used, if desired.

In one embodiment, the render output sub-regions for which primitive lists may be prepared all comprise an integer number of rendering tiles. For example, a sub-region could be sized such that it corresponds to a single rendering tile, or alternatively a sub-region could be sized such that it corresponds to (i.e. encompasses) more than one rendering tile. In other words, the size of the render output sub-regions may be varied by choosing a different particular integer number of tiles that the sub-region corresponds to (encompasses).

In another embodiment, however, the render output sub-regions may be sized such that they correspond to portions of rendering tiles. For example, the sub-regions may be sized such that they to correspond to (i.e. encompass) half a tile, or a quarter of a tile, or one and a half tiles, etc.

Although the sizes of (at least some of) the sub-regions for which primitive lists are to be prepared can be varied in accordance with the technology described herein, in an embodiment the size (and shape) of each sub-region is such that each sub-region encompasses a different area of the render output than each other render output sub-region to be used. In other words, the render output is divided into a plurality of sub-regions to be used, wherein each of these sub-regions comprises a different portion of the render output than the other sub-regions.

In an embodiment (a so-called "flat" implementation), the render output is divided into a single set of sub-regions for which primitive lists may be prepared, wherein each sub-region in the set of sub-regions covers a different portion of the render output. Although the size of each sub-region to be used when sorting primitives into lists is in an embodiment variable (in accordance with the technology described herein), none of the sub-regions overlap with any other sub-regions in the set of sub-regions. In other words, every portion of the render output (i.e. each tile of the render output) is in an embodiment covered by single sub-region only. The single set of sub-regions in an embodiment comprises sufficient sub-regions to cover the entirety of the render output.

In this embodiment, when a primitive is determined to fall (entirely) within a single sub-region, then that primitive is listed in the list corresponding to that single sub-region only, i.e. it is not listed for any other sub-regions. If a primitive is determined to fall within (or across) plural sub-regions (corresponding to different portions of the render output) then that primitive may be listed in each of the lists corresponding to each of the sub-regions.

It would be possible for a single size to be chosen for each sub-region of the single set of sub-regions for which primitive lists may be prepared, said single size being variable in accordance with the technology described herein. In other words, it would be possible for the size of each sub-region in the single set of sub-regions that the render output is divided into when preparing lists of primitives to be same (that single size being variable in accordance with the technology described herein). For example, the render output being generated could be divided into a set of sub-regions that are all e.g. 4 (2×2) tiles in size, or, alternatively, the render output could be divided into sub-regions that are all only a single (1×1) tile in size.

However, in an embodiment, it is possible for sizes of respective sub-regions in the single set of sub-regions to be chosen and varied on an individual sub-region by sub-region basis. In other words, sizes for sub-regions may in an embodiment be chosen such that a particular sub-region size may different to the size of at least some of the other sub-region sizes. Thus it would be possible for the size of one sub-region of a render output to be 4 (2×2) tiles in size, and another sub-region of the same render output to be 1 (1×1) tiles in size, etc.

In an embodiment, different sizes may be chosen for different sub-regions covering different areas of the render output to be generated. For example, and as will be discussed in greater detail below, a smaller size of sub-region could be chosen for a particular area of the render output that is predicted to have a relatively high density of primitives, whilst a larger size of sub-region could be chosen for another particular area of the render output that is predicted to have a relatively low density of primitives.

However the sub-region sizes are in an embodiment chosen such that none of the sub-regions overlap with any of the other sub-regions.

Although in an embodiment the sizes of each of the sub-regions of the single set of sub-regions that the render output is divided into may be chosen (or varied) in accordance with the technology described herein, it would also be possible for the sizes of only some of the sub-regions of the single set of sub-regions to be variable. In other words, it would be possible for some of the sub-regions to have sizes that are to be chosen (or determined), and for other sub-regions to have sizes that are fixed.

The sub-regions for which primitive lists may be prepared for the render output being generated are in an embodiment sized such that the entire set of sub-regions cover the entire render output, i.e. the set of sub-regions for which primitive lists are to be prepared in an embodiment encompass all the individual rendering tiles that the render output is divided into. In other words, in an embodiment the entire render output is divided into sub-regions to be used for forming lists of primitives, with all portions (i.e. all tiles) of the render output covered by (e.g. different) sub-regions.

Thus it will be understood that, since in an embodiment the sizes of sub-regions in the single set of sub-regions that the render output is divided into may be chosen, and since in an embodiment the single set of sub-regions is sufficient to cover the entire render output without any sub-region overlapping with each other, the total number of sub-regions in the single set of sub-regions is also in an embodiment variable. In other words, the total number of sub-regions that the render output is divided into is in an embodiment not fixed, but is in an embodiment rather dependent on the sizes of the sub-regions that are chosen. For example, the render output may be divided into lots of smaller sub-regions, or, alternatively, could be divided into relatively few larger sub-regions.

In another embodiment, rather than dividing the render output up into a single set of sub-regions (only), primitive lists may be prepared for at least two different sets of sub-regions, each of said sets of sub-regions comprising sufficient sub-regions to cover the entire render output. A given set of sub-regions will contain plural sub-regions, with primitive lists (potentially) able to be prepared for each of the plural render output sub-regions in the set of sub-regions.

The size of each render output sub-region in a given set of render output regions could be variable (e.g. in a similar manner to the variably-sized sub-regions in the single set of sub-regions described above in the "flat" implementation), and in an embodiment, this is the case.

However, in another embodiment, all the render output sub-regions in a given set of render output sub-regions all have the same size (and shape) as each other. In this embodiment, the render output sub-regions of a given set of sub-regions all have a (uniform) size that is different to the size of (all of) the render output sub-regions in any other set of dub-regions.

The sets of render output sub-regions for which primitive lists can be prepared are in an embodiment arranged such that the render output is effectively overlaid by plural layers of sets of sub-regions (with each layer being one set of sub-regions). Each layer should, and in an embodiment does, have different sized sub-regions for which primitive lists can be prepared to the other layers. The layers (sets of sub-regions) in an embodiment have progressively decreasing levels of resolution (i.e. their sub-regions encompass increasing numbers of rendering tiles). These arrangements can allow, for example, the render output to be effectively covered by plural different resolution layers of sub-regions, with each such "layer" being made up of a set of plural sub-regions in which each sub-region contains the same number of rendering tiles, and the sub-regions in different "layers" containing different numbers of rendering tiles.

Such arrangements effectively allow primitive lists to be prepared for progressively decreasing levels of resolution (i.e. division into sub-areas) of the render output. This allows the resolution at which the primitive lists are prepared to be varied and controlled.

The sets of render output sub-regions for which primitive lists can (potentially) be prepared are in an embodiment arranged in a hierarchical fashion, i.e. such that the number of sub-regions in each set progressively changes as one moves through the sets of sub-regions. The sets of sub-regions are in an embodiment arranged such that they effectively form a pyramidal structure as one progresses up the sets.

The render output area and/or number of rendering tiles included in the sub-regions in an embodiment progressively increases as one moves up the sets of sub-regions from lowest set (which may, e.g., be, and in an embodiment is, a base, single rendering tile sub-region set). In an embodiment, the sets of sub-regions are arranged such that the sub-regions in each successive set have 4 times the area (and/or as many rendering tiles in them) as the immediately preceding set of sub-regions, i.e. such that if the lowest (base) set of sub-regions is of single rendering tile sub-regions, there is then a set of four (2×2) rendering tiles sub-regions, then a set of 16 (4×4) rendering tile sub-regions, and so on, in an embodiment up to a set containing a single sub-region that encompasses the entire render output. In an embodiment there is, in effect, three or more such layers.

Similarly, the sets of sub-regions layering hierarchy are in an embodiment arranged such that primitive lists can, in effect, be prepared for the entire render output, for the render output area divided into four sub-regions, for the render output area divided into 16 sub-regions, for the render output area divided into 64 sub-regions, and so on, down to its division into the individual rendering tiles.

(Varying the sub-regions by a factor of 4 on each successive level is a particularly convenient arrangement for increasing the size as the levels change. However, it is not essential and other arrangements could be used if desired.)

In an embodiment, the step of determining a size of sub-regions for which primitive lists are to be prepared in an embodiment comprises choosing a subset of the plurality of available sets of sub-regions (for which primitive lists may (potentially) be prepared) to use when preparing primitive lists for the render output being generated. In other words, whilst the system is (potentially) able to prepare primitive lists for a plurality of sets of sub-regions (wherein each set comprises different-sized sub-regions relating to different layers of sub-regions), the system in an embodiment chooses only some (or only one) of the plurality available sets of sub-regions when actually preparing primitive lists for the render output being generated.

Thus, in an embodiment, the system is able to "enable" some sets (e.g. layers) of sub-regions that are of interest when preparing primitive lists for the render output being generated (based on the distribution of primitives in another render output), whilst effectively "disabling" other sets of sub-regions.

For example, in an arrangement wherein there are three different sets of sub-regions for which primitive lists may (potentially) be prepared, e.g. a first (base) set of sub-regions comprising single rendering tile sub-regions, a second set comprising sub-regions each four (2×2) rendering tiles in size, and a third set comprising sub-regions each 16 (4×4) rendering tiles in size, the system can be configured such that it may "choose" to only enable the use of e.g., the first and second sets of sub-regions (and not the third set), when actually preparing lists of primitives for the render output being generated. Alternatively, the system may, for example, instead choose to only enable the use of the second and third sets of sub-regions (and not the first set of sub-regions) when preparing lists of primitives for the render output being generated.

It would be possible for the step of choosing of specific sets of sub-regions to enable (from the plurality of available sets) to comprise selecting only a single set of sub-regions to use when preparing lists of primitives for the render output being generated. However, in an embodiment, the system is able to choose multiple sub-regions to enable from the available plurality of sets of sub-regions.

The plurality of sets that are enabled in an embodiment comprise consecutive sets (layers) in a hierarchical arrangement, e.g. the first and second sets (layers), as described above. However the enabled sets may also comprise non-consecutive sets, e.g. the first and third sets (layers).

The step of choosing of specific sets of sub-regions to enable in an embodiment comprises choosing specific sets of sub-regions of the plurality of available sets of sub-regions to enable across the entirety of the render output being generated. For example, in a hierarchical arrangement such as the one discussed above, the system may choose to enable the first and second sets of sub-regions across the entirety of the render output, but not to enable the third set of sub-regions across any part of the render output.

The specific sets of sub-regions of the plurality of available sets of sub-regions to enable across the entirety of the render output are in an embodiment selected based on the distribution of primitives across another render output (which can, as discussed below, be used to determine a predicted distribution of primitives for the render output being generated). For example, the system may choose to enable lower sets of sub-regions (i.e. sets of smaller sub-regions) (and to, e.g., disable higher sets of sub-regions (i.e. sets of larger sub-regions)) when preparing primitive lists for (the entirety of) a render output being generated if the render output is predicted to have a relatively high density of primitives (across e.g. at least a portion of the render output). Correspondingly, the system may choose to disable lower sets of sub-regions (and to, e.g., enable higher sets of sub-regions) when preparing primitive lists for a render output that is predicted not to have a relatively high density of primitives (across e.g. any portion of the render output).

Similarly, the system may choose to enable higher sets of sub-regions (and to, e.g., disable lower sets of sub-regions) when preparing primitive lists for a render output that is predicted to have a relatively low density of primitives (across e.g. at least a portion of the render output), and to disable higher sets of sub-regions (and to, e.g., enable lower sets of sub-regions) when preparing primitive lists for a render output that is predicted not to have a relatively low density of primitives (across e.g. any portion of the render output).

Alternatively, in some arrangements, the system may choose to enable different subsets of the plurality of available sets of sub-regions in different portions (i.e. different regions) of the render output being generated. For example, the system may choose to enable (only) the first and second set (i.e. the two lowest) sets in one area of the render output being generated, and to enable the second and third sets in a second area of the render output being generated. For example, and as discussed below, it may be desirable to e.g. enable lower level sets (i.e. sets of smaller sub-regions) for use in areas of predicted higher primitive density for the render output being generated, and to enable higher level sets (i.e. sets of larger sub-regions) for use in areas of predicted lower primitive density for the render output being generated.

The sizes of sub-regions for which primitive lists are to be prepared for a first render output being generated is determined or chosen (according to the technology described herein) based on the distribution of primitives across another render output. The distribution of primitives across the another render output in an embodiment provides means of predicting what the distribution of primitives across the first render output (i.e. the render output being generated) will be. This then in an embodiment enables the system to choose an appropriate sub-region size for the render output being generated (or for specific regions of the render output being generated) based on the predicted distribution of primitives across render output being generated. For example, if it is predicted that there will be a higher density of primitives across a specific region of the render output being generated, then the system may, e.g., choose to use a relatively small sub-region size across that specific region of the render output, when sorting the primitives into lists.

Thus, in an embodiment of the technology described herein, the step of determining a size of sub-regions of a first render output to be used when sorting primitives to be processed for the first render output into lists comprises predicting an area of higher density of primitives in the first render output based upon the distribution of the primitives across the another render output, and choosing a smaller size of sub-regions to be used for the predicted area of higher density of primitives in the first render output when sorting primitives to be processed for the first render output into lists.

Correspondingly, if it is predicted that there will be a lower density of primitives across a specific region of the render output being generated, then the system may, e.g., choose to use a relatively large sub-region size across that specific region of the render output, when sorting the primitives into lists.

Thus, in an embodiment of the technology described herein, the step of determining a size of sub-regions of a first render output to be used when sorting primitives to be processed for the first render output into lists comprises predicting an area of lower density of primitives in the first render output based upon the distribution of the primitives across the second render output, and choosing a larger size of sub-regions to be used for the predicted area of lower density of primitives in the first render output when sorting primitives to be processed for the first render output into lists.

The distribution of primitives across the first render output being generated may be predicted to directly correspond to the distribution of primitives across the another render output. The sizes of the sub-regions to be used when sorting the primitives into lists for the first render output may then be chosen on this basis. In other words, the sizes of sub-regions for the first render output (i.e. the render output being generated) to use when sorting primitives into lists may be chosen as if the distribution of primitives across the first render output being generated will be exactly the same as that of the another render output. For example, if there is determined to be a higher distribution of primitives in a particular area of the another render output, then it is predicted that there will also be a higher density of primitives in a corresponding region of the first render output (i.e. the render output being generated), and the sizes of the sub-regions to use when sorting primitives for that area will be chosen on that basis. For example, a smaller size of sub-regions may be chosen to be used in that area.

Thus in an embodiment of the technology described herein, the step of determining a size of sub-regions of a first render output to be used when sorting primitives to be processed for the first render output into lists comprises predicting an area of higher density of primitives in the first region that corresponds to a determined area of higher density of primitives in the another render output, and choosing an (e.g. smaller) size of sub-region to be used for the predicted area of higher density of primitives for the first render output on this basis.

Correspondingly, if there is determined to be a lower distribution of primitives in a particular area of the another render output, then it may be predicted that there will also be a lower density of primitives in a corresponding region of the first render output (i.e. the render output being generated), and the sizes of the sub-regions to use when sorting primitives for that area may be chosen on that basis. For example, a larger size of sub-regions may be chosen to be used in that area.

Thus in an embodiment of the technology described herein, the step of determining a size of sub-regions of a first render output to be used when sorting primitives to be processed for the first render output into lists comprises predicting an area of lower density of primitives in the first region that corresponds to a determined area of lower density of primitives in the another render output, and choosing an (e.g. larger) size of sub-region to be used for the predicted area of lower density of primitives for the first render output on this basis.

The Applicants have noted in this regard that the render output that has been already generated for the frame previous to that of the present frame (the frame that is being generated) will often have a distribution of primitives that is most similar to that of the present frame. Hence the distribution of primitives across the previous frame is useful for predicting the distribution of primitives across the present render output being generated, and hence for choosing appropriate sub-region sizes across the render output being generated, in accordance with the technology described herein.

Thus, in an embodiment of the technology described herein, the size of sub-region to use when sorting primitives to be processed for a first render output (i.e. the present frame) into lists is determined based on the distribution of primitives across the immediately previously generated render output (i.e. the immediately preceding frame).

In other embodiments, however, the sizes of sub-regions to be used when sorting primitives to be processed into lists for the present render output (frame) may be chosen based upon the distribution of primitives across a previously generated render output other than the immediately preceding (i.e. last) render output (frame) that has been generated. For example, the size of sub-region to be used for the present render output (frame) could be chosen based on the distribution of primitives across the render output (frame) generated M frames ago (where M is an integer greater than 1), such as 5 frames ago, or 60 frames ago, for example. This type of arrangement could, for example, be useful in situations where it is known that there is a temporal pattern in the sequence of frames such that it is expected that a frame other than the immediately preceding (i.e. last) frame would be likely to have a most similar primitive distribution to that of the present frame being generated.

Although in various arrangements the size of sub-regions to be used for the render output being generated may be determined (chosen) based on the distribution of primitives across one other render output only, in some other embodiments the size of sub-regions may be chosen based on the distributions of multiple render outputs. In these other embodiments, the size of sub-regions for a given frame may, for example, be based on each of the distributions of primitives across a plurality of other (e.g., and in an embodiment, preceding) render outputs.

For example, the size of sub-regions to be used for a render output being generated may be chosen based on the distributions of the primitives across the N previous frames, where N is an integer greater than one. Alternatively, the size of the sub-regions could be chosen based on the distributions of primitives across a plurality of frames that do not directly follow one after the other, such as alternate preceding frames. For example, the plurality of frames could comprise the frame generated 2 frames ago, the frame generated 4 frames ago and the frame generated 6 frames ago.

Thus, in another embodiment of the technology described herein, the size of sub-regions to be used when sorting primitives to be processed for a render output to be generated into lists is determined (or chosen) based on the distributions of primitives across a plurality of other render outputs.

In these arrangements, the sizes of sub-regions to be used for the render output to be generated could be chosen based on, e.g., the average primitive distribution across the plurality of other (e.g. previously generated) render outputs. However, in an embodiment, differences in the distributions of primitives across the plurality of render outputs are determined, and then these differences are used to predict the distribution of primitives across the render output being generated. The sizes of the sub-regions to be used when listing primitives for the render output being generated are then determined (or chosen) based on the predicted distribution of primitives for the render output being generated.

The Applicants have noted in this regard that, for a plurality of render outputs (such as, for example, a sequence of previously generated frames), the difference in the primitive distributions across these sequences of frames may be illustrative of the movement of various objects as time progresses in the scene being rendered. This determined movement may then be extrapolated and used as a basis for predicting the distribution of primitives across a render output that is being generated. The sizes of sub-regions to be used when sorting the primitives for the render output being generated may be chosen based on this predicted distribution.

By accounting for the differences in distribution of primitives across multiple render outputs, a predicted distribution of primitives for the present render output being generated may be determined which accounts for movements of objects. The sizes of sub-regions for which primitive lists are to be prepared may then be chosen based on this predicted distribution for the render output.

Thus, in another embodiment of the technology described herein, the size of sub-regions of a first render output to be used when sorting primitives to be processed for the first render output into lists is determined based upon a predicted distribution of primitives for the first render output, wherein the predicted distribution is determined based on the differences in distribution of primitives across a plurality of other render outputs.

The distribution of primitives across the render output that is used to determine (or choose) the size of sub-regions to be used in accordance with the technology described herein could be provided to, or retrieved by, the system (as desired)

from, e.g. an external source. However, in embodiments, the system will determine (i.e. measure) the distribution of primitives for a particular render output itself, so that that it may (later) be used to select the size of sub-regions for a render output being generated.

Thus in an embodiment of the technology described herein, the method further comprises determining (and the system is further configured to determine) a distribution of primitives across a render output, so that this distribution may be used to determine a size of sub-regions to use when sorting primitives into lists for another render output being generated.

The determining (i.e. measuring) of the distribution of the primitives for a render output in an embodiment takes place when processing that render output. For example, the determining of a distribution of primitives for a render output may be performed by the tiler when (or at substantially the same time as) sorting primitives for that render output into primitive lists (as will be discussed further below). The distribution information for that render output may then be processed (either by the tiler itself, or, e.g. by an external processing element such as a CPU or MCU, for example) and then later used in accordance with the technology described herein to determine a size of sub-regions to use for sorting primitives into lists when processing another (subsequent, e.g. the next) render output to be generated.

Once the sizes of sub-regions of a render output for which primitive lists are to be prepared has been determined, primitives are in an embodiment sorted into those respective lists. The process of determining which sub-regions of the render output area a primitive could need to be listed for can be carried out in any appropriate and desired manner. Essentially the process will involve identifying, for each primitive to be processed for the render output, which sub-regions of the render output the primitive (potentially) falls in. Various techniques for sorting and binning primitives into tile-lists and render output regions or areas, such as exact binning, or bounding box binning, or anything in between, can be used for this process. In an embodiment bounding box binning is used.

In an embodiment, an initial determination of the render output sub-regions that a primitive to be rendered could fall within is made, e.g., and in an embodiment, based on a determined location of the primitive (in an embodiment of a bounding box for the primitive) in the render output.

In some embodiments (such as the so-called "flat" implementation, described above), wherein the render output is divided into a single set of sub-regions for which primitive lists are to be prepared, once this initial determination of the render output sub-regions that a primitive to be rendered could fall within has been made, the primitive is in an embodiment listed in the primitive lists for all of those sub-regions.

In other embodiments (such as the so-called "hierarchical" implementation, described above), wherein primitive lists can be prepared for different sets of sub-regions, the system in an embodiment determines a specific (single) set of sub-regions of the plurality of available (i.e. "enabled") sets that the primitive could be listed in, and lists the primitive in sub-regions for that specific set only. (The primitive in an embodiment may not, however, be listed in sub-regions corresponding to any "disabled" sets, as described above).

The method of choosing which particular set of "enabled" sub-regions primitive should be listed of the plurality of "enabled" sets can be carried out in any suitable and desired manner. For example, the system may determine which set of sub-regions (e.g. which layer) to list the primitive in based on how many sub-regions of a given set that primitive's bounding box has determined to (at least partially) cover. For example, the system may first test the primitive against the sub-regions of a highest level set (layer) that has been enabled (i.e. the set which has the largest sub-region size). If the number of sub-regions covered by the primitive (e.g. by the primtiive's bounding box) is determined to be below a certain threshold, then the system steps down a level to the next (enabled) set (layer) (i.e. an enabled set that has a smaller sub-region size) and repeats the process until the threshold number of sub-regions is met. The primitive is then listed in the primitive lists corresponding to those sub-regions, for this set (wherein the condition is met). Such a method is described in the Applicant's earlier UK Patent No. 2433014.

Alternatively, the set of sub-regions for which a primitive should be listed could be chosen by calculating a "cost function" which weighs up the costs and benefits of listing a primitive in various sets and chooses a set for the primitive to be listed that minimises this cost function. Such a method is described in the Applicant's earlier UK Patent Application No. 1320136.3 (Publication No. 2509822).

Other methods for choosing for which set of sub-regions a primitive should be listed are of course possible, however.

The individual primitive lists and the primitives in them can be arranged in any desired and suitable fashion and include any desired and suitable data. The lists are in an embodiment arranged and contain data in the manner that is already used for such lists in the graphics processing system in question. Thus they in an embodiment include, for example, an identifier for, and indices or pointers to the vertices for, and/or commands for, etc., each primitive in the list. (Thus references herein to writing, listing, binning, reading, etc., a primitive in a primitive list are intended, unless the context requires otherwise, to refer to the writing, etc., of the appropriate commands, data, etc., for the primitive (that represent and/or are associated with the primitive) in a primitive list.)

The primitives are in an embodiment listed (ordered) in each list in the desired rendering order (first to last), as this allows the primitives to be read from the lists on a first-in, first-out basis. As is known in the art, the primitives will usually be generated in the order in which they are to be rendered. In such a case the primitives can simply be, and in an embodiment are, listed in each list in the order that they are generated.

When sorting various primitives for the render output into lists corresponding to the various sub-regions, the system in an embodiment also (i.e. at substantially the same time) determines locations of the primitives being sorted in order to (gradually) determine a distribution of primitives across the render output. In other words, when the system determines which sub-regions of the render output a primitive (potentially) falls in, the system in an embodiment also records the location of that primitive in the render output. By recording the locations of all of the primitives as they are processed in this manner, the system is able to determine and record the distribution of primitives across the render output.

The Applicants have noted in this regard that although there is a cost associated with determining a distribution of primitives for a given render output when processing that render output, and for processing that distribution to determine a size of sub-region to use when processing a subsequent render output to be generated, these costs may be outweighed by the benefits (discussed above) conferred by choosing suitable sizes of sub-regions to use when sorting primitives for a render output into lists, as in the technology described herein.

The Applicants have further noted in this regard that several of the processes associated with sorting primitives into primitive lists (such as identifying the location of the primitive to determine which sub-regions the primitive (potentially) falls within) may be also be useful for determining the distribution of primitives across the render output. Thus, by determining the locations and distributions of primitives across a render output at (substantially) the same time as sorting primitives into lists, as opposed to, say, determining the distribution of primitives across a render output at a separate time, the system is able to avoid unnecessarily reproducing those several processes that may be useful for both of the above-mentioned steps (the sorting primitives of into lists and the determining the distribution of primitives across the render output).

Thus, in an embodiment of the technology described herein, the method includes sorting primitives into primitive lists representative of each of the sub-regions of the render output, and at substantially the same time determining a distribution of primitives across the render output.

The steps (operations) of sorting primitives for a render output into primitive lists and determining a distribution of primitives across the (same) render output accordingly in an embodiment overlap. In other words, the determining of the distribution of primitives in an embodiment occurs (or at least begins) whilst the primitives for the render output are still being sorted into primitive lists. (This enables the system to avoid reproducing those several processes that may be useful for carrying out each of these steps, as described above).

Thus, in an embodiment of the technology described herein, the determining of a distribution of primitives across the render output starts before all of the primitives to be processed for the render output have been sorted into primitive lists representative of each of the sub-regions of the render output.

It should be noted here, however, that although the determining of the distribution of primitives for a render output in an embodiment occurs at the same time as sorting the primitives into lists (e.g. to avoid the unnecessary duplication of various processes, as described above) this is not necessary. The determining of the distribution of primitives could, for example, occur prior to or after the sorting of primitives into lists.

The determining of a distribution of primitives across a render output may be carried out in any suitable or desired manner.

The determining of a distribution of primitives across a render output in an embodiment comprises determining a distribution of primitives across the plane (the x-y plane) of the render output.

The determining of a distribution of primitives across a render output in an embodiment comprises determining a distribution of primitives across and/or in plural different regions of the render output. The determining of a distribution of primitives across a render output in an embodiment includes determining a frequency (or frequencies) and/or a density or densities of primitives that are located (at least in part) in (or across) plural different (various) regions of the render output. For example, the determining of the distribution of primitives across the render output could include determining the number of primitives that are located in a number of different (x-y plane) regions of the render output. Alternatively the determining of the distribution of primitives across the render output could include determining a number of primitives that are located within various x and/or y value (position) ranges. Other methods are of course possible, however.

Thus in an embodiment of the technology described herein, the step of determining a distribution of primitives across a render output comprises determining, for a plurality of different regions of the render output, the number of primitives (at least partially) contained within those regions of render output.

In an embodiment, the determining of a distribution across a render output includes drawing up a first histogram showing the distribution of primitives projecting onto the x axis for that render output, and drawing up a second histogram showing the distribution of primitives projecting onto the y axis for that render output.

The histograms may be drawn up in any desired and suitable manner. In one arrangement, the system draws up the histograms by dividing the render output into a set of x-value ranges across the x axis and a set of y-value ranges across the y axis. When the location for a primitive is determined, it is also determined (and recorded) which x-value range and which y-value range the primitive is located in. As all the primitives for the render output are processed in this manner, the total number of primitives located within each x-value range and each y-value range is determined. This information is then to generate the two histograms that illustrate, respectively, the number of primitives projecting onto the x and y axes.

The x-value ranges and y-value ranges for the histogram may be of a fixed and uniform size. For example, the x-value ranges and y-value ranges may all be of a width (or height) that corresponds to the width (or height) of a single tile, or half a tile, etc.

However, in some embodiments, the various x-value ranges and y-value ranges may be of different sizes. In these embodiments, the histograms are in an embodiment generated by calculating a frequency density for each of the various x-value ranges and y-value ranges. This is in an embodiment done by dividing the total frequency of primitives for a given x-value range or y-value range (i.e. the number of primitives found to be located within that x-value range or y-value range) by the range itself.

The method of drawing up two histograms to determine distribution of primitives across a render output represents just one possible method for determining the distribution of primitives across a render output. Other methods for determining the distribution of primitives across a render output are of course possible.

In another embodiment, for example, rather than drawing up two histograms representing the distribution of primitives projecting along the x and y axes only a single histogram is drawn up representing the distribution of primitives across just one of these axes.

In another embodiment, rather than drawing up histograms to determine the distribution of primitives across a render output, the render output may be divided up into a plurality of (e.g. equally sized) regions (areas) in the x-y plane. The system in an embodiment measures the distribution of primitives across the render output by keeping a tally for each region of how many primitives are determined to be located within that region.

In some embodiments, when determining a distribution of primitives across a render output, the system is in an embodiment able to choose a resolution (from a plurality of possible resolutions) at which to determine the distribution of primitives across the render output.

In these embodiments, although the resolution at which the distribution of primitives is determined could be uniform across the entirety of the render output, the system is in an embodiment able to use different resolutions when determining the distribution of primitives across different areas (regions) of the render output. In particular, the resolution at which the distribution of primitives is determined is in an embodiment variable based on distribution of primitives across a different render output. For example, the resolution at which the distribution of primitives is determined may be varied based on the distribution of primitives for the previously generated render output (i.e. the previous frame).

The Applicants have noticed in this regard that the ability to vary the resolution at which the distribution of primitives is determined (e.g. based on the distribution of a previously generated frame) may advantageously allow the system to choose a resolution that more accurately and precisely (and efficiently) measures the primitive distribution for the render output being considered. For example, inspecting the distribution for a first render output (e.g. the previously generated render output) may allow the system to determine an area of interest within that previously generated render output comprising a higher density of primitives. Based on this, the system can then e.g. choose to use a higher resolution when determining the distribution of primitives across a corresponding area of a second render output, so that a higher resolution of primitive distribution can be determined for that area of interest.

Correspondingly, inspecting the distribution for a first render output (e.g. the previously generated render output) may allow the system to determine an area within that previously generated render output comprising a lower density of primitives. Based on this, the system can then e.g. choose to use a lower resolution when determining the distribution of primitives across a corresponding area of a second render output, so that a lower resolution of primitive distribution can be determined for that area.

Thus, in an embodiment of the technology described herein, the determining of a distribution of primitives across a render output comprises determining said distribution at a resolution which is determined is based on the distribution of primitives across another render output.

The varying of the resolution at which the distribution of primitives is determined can be carried out in any suitable and desired manner.

In one embodiment, wherein, as described above, the determining of a distribution across a render output includes drawing up a pair of histograms showing the distribution of primitives projecting onto the x and y axes for that render output, the varying of the resolution at which the distribution of primitives is determined is achieved by varying the various x-value ranges and y-value ranges that are used to draw up the histograms (as described above).

For example, if the system determines there to be an area of interest comprising a high density of primitives in a first (e.g. a previous) render output, then the system may choose to reduce the sizes of the x-value ranges and y-value ranges to be used in a corresponding area of a second render output for which a histogram is now to be prepared, so that a higher resolution of primitive distribution can be determined for that area of interest. Correspondingly, if the system determines there to be an area comprising a low density of primitives in a first (e.g. a previous) render output, then the system may choose to increase the sizes of the x-value ranges and y-value ranges to be used in a corresponding area of a second render output for which a histogram is now to be prepared, so that lower resolution of primitive distribution can be determined for that area of interest.

Thus in another embodiment of the technology described herein, the drawing up of the two histograms when determining a primitive distribution for a render output further comprises determining the number of primitives contained in a plurality x-value ranges and y-value ranges, wherein the size of at least some of the x-value and y-value ranges may be chosen based on the distribution of primitives across another render output.

Other means of varying the resolution at which the distribution of primitives is determined for a render output are of course possible, however.

For example, in embodiments wherein (as described above) a distribution of primitives across a render output is determined by dividing the render output into a plurality of regions (areas) in the x-y plane for which counts, frequencies and/or densities of primitives are to be determined, the resolution at which the distribution of primitives is determined may be varied by e.g. varying the sizes of the various regions across the render output.

The determining of the distribution of primitives across a render output in an embodiment occurs for each and every render output that is generated. However, in some embodiments, distributions of primitives are determined for only some (and not all) render outputs that are generated. For example, distributions of primitives may only be determined for every other render output that is generated, or for every fifth render output that is generated, etc.

Once the distribution of primitives has been determined for a render output, this determined distribution is in an embodiment processed by the system in order to determine a size of sub-regions for which primitive lists are to be prepared for another (e.g. the next) render output that is to be prepared, in accordance with the methods described above.

The determined distributions may be (and in some arrangements, are) cached or stored prior to be being processed (in order to determine a size of sub-regions for which primitive lists should be prepared for another render output). The (determined) primitive distributions can be stored in a local, more rapidly accessible memory of the graphics processor. When the system is to determine sizes of sub-regions for which primitives should be prepared for a new render output is to be generated, the system in an embodiment retrieves the determined distribution (or determined distributions) data from the cache or memory, so that it may be processed in order to determine sizes of sub-regions for which primitives should be prepared for the new render output.

The caching or storing of determined primitive distributions is, in an embodiment, used in arrangements wherein the size of sub-regions for which primitive lists are to be prepared are determined based on the distributions of primitives across a plurality of different render outputs. As will be understood, in these arrangements, a determined distribution of primitives for a given render output may need to be inspected when determining sub-region sizes for plural (different) render outputs that are being generated. Thus, for these arrangements, since the system will need to process a primitive distribution of a given render output multiple times for multiple different (new) render outputs to be generated, the system in an embodiment stores a particular determined primitive distribution in a memory or cache, so that it can be retrieved for processing each time it is required.

In various arrangements described above, the distribution of primitives across one render output (or alternatively, as described above, a plurality of render outputs) is (or are) used to determine sizes of sub-regions for which primitive lists are to be prepared for a different render output that is being generated. However, in other arrangements, instead of using a distribution of primitives across a different render output (or render outputs) to choose sub-region sizes for which primitive lists are to be prepared for the render output being generated, the sub-region sizes may instead be chosen based on a determined distribution of primitives across the render output that is being generated itself.

The Applicants have noted in this regard that the benefits (as described above) of choosing appropriate sub-region sizes for which primitive lists are to be prepared for a render output may outweigh the costs associated with determining a distribution of primitives across the render output. This may particularly be the case when the distribution of primitives across the render output is determined at a coarser (i.e. lower) resolution than that at which the render output is divided into the various sub-regions for which primitive lists are to be prepared. Determining the distribution of primitives across the render output at a relatively coarse distribution, and then using this determined distribution of primitives for the render output to choose sub-region sizes at a higher resolution, can lead to significant savings in terms of, e.g. memory bandwidth and power consumption for the primitive listing and rendering process, compared to prior art systems.

Thus, a third embodiment of the technology described herein comprises a method of sorting graphics primitives for rendering into lists representing different sub-regions of a render output to be generated in a graphics processing system, each list indicating primitives to be processed for the respective sub-region of the render output, the method comprising:

determining a distribution of primitives for a render output being generated; and determining a size of at least one of the sub-regions of the render output to be used when sorting primitives to be processed for the render output into sub-region lists for the render output based on the determined distribution of primitives across the render output.

A fourth embodiment of the technology described herein comprises a graphics processing system comprising:

primitive list processing circuitry configured to sort primitives for rendering into lists representing different sub-regions of a render output to be generated by the graphics processing system, each list indicating primitives to be processed for the respective sub-region of the render output;

primitive distribution determining circuitry configured to determine a distribution of primitives for a render output being generated; and predictor processing circuitry configured to determine a size of at least one of the sub-regions of a render output for the primitive list processing circuitry to use when sorting primitives to be processed for the render output into lists based on the distribution of primitives for the render output determined by the primitive distribution determining circuitry.

In these embodiments, before sorting primitives for the render output being generated into primitive lists, a distribution of primitives for the render output being generated is determined.

The distribution of primitives for the render output being generated may be determined in any suitable and desired manner, including those methods described above.

However, the determining of the distribution of primitives for the render output in an embodiment occurs at a lower resolution and/or precision (accuracy) than the subsequent sorting of primitives into lists for the render output.

The distribution of primitives for the render output can be determined at a lower resolution, and/or precision, etc., than the sorting of the primitives into lists for the render output in any suitable and desired manner. For example, the primitive distribution could be determined using larger regions of the render output than the sub-regions that the primitive lists will be prepared for. Additionally or alternatively, the primitive distribution could be, and in an embodiment is, determined using less precise (less accurate) positions for the primitives than the positions for the primitives that are used when sorting the primitives into primitive lists for the respective sub-regions of the render output. (Thus, the primitive distribution is in an embodiment determined by using less-exactly determined locations for the primitives, but the primitives are in an embodiment then sorted into primitive lists using more-exactly determined locations for the primitives.)

Once all the primitives have been sorted and primitive lists have been prepared for the render output sub-regions as discussed above, the rendering tiles can then be processed and rendered using the primitive lists to determine which primitives need to be processed for each tile.

This rendering process may be and in an embodiment is carried out in a similar manner to known tile-based rendering systems. Thus, in an embodiment, each rendering tile is processed and rendered separately, i.e. the separate, individual tiles are rendered one-by-one. This rendering can be carried out in any desired manner, for example, by rendering the individual tiles in succession or in a parallel fashion. Once all the tiles have been rendered, they can then be recombined, e.g., in a frame buffer, e.g. for display.

As each rendering tile is processed and rendered, it will be necessary to check the primitive lists of all the render output sub-regions that include (cover) the rendering tile in question in order to determine the primitives that must be processed and rendered for the tile.

This primitive list checking and the identifying of primitives to be rendered for a given rendering tile can be carried out as desired. In an embodiment the primitive lists are provided to a primitive selection unit that selects the next primitive to be rendered from the primitive lists and then provides that primitive to a rendering unit (e.g. pipeline) for rendering. The primitive selection unit in an embodiment comprises a tile read unit.

As will be understood, the number of sub-regions for which primitive lists have been prepared that cover (and therefore will need to be checked when rendering) a particular rendering tile may vary depending on the sizes of sub-regions that were chosen to be used when sorting the primitives into lists in accordance with the methods described above.

(In a "flat" type implementation (as described above), for example, multiple primitive lists for multiple small sub-regions, each covering a fraction of a particular rendering tile, may have been prepared. In this case, it will be necessary to check each of these primitive lists to determine the primitives that must be processed and rendered for the tile. Alternatively, only a single primitive list for a single large sub-region covering the entirety of the rendering tile may have been prepared. In this case, it will be necessary to check this (single) primitive list only.) In a "hierarchical" type implementation (as described above), for example, the number of sub-regions for which primitive lists have been prepared may depend on the number of sets (layers) that have been enabled.)

When there is more than a single primitive list to checked for a single rendering tile, in an embodiment all of those primitive lists are provided to the primitive selection unit in parallel (i.e. simultaneously), with the primitive selection unit then selecting the next primitive to process from one of the lists.

The set of primitive lists that primitives are to be selected from for a given rendering tile (i.e. the set of primitive lists that the primitive selection unit should read to identify primitives for rendering for a given tile) can be indicated (e.g. to the primitive selection unit) in any desired fashion, for example by sending this data as appropriate to the graphics processor (e.g. primitive selection unit). In an embodiment, this information is sent when a new tile is to be rendered, e.g. as part of or associated with a "new tile" command (the command that tells the rendering unit to start rendering a new tile). Thus, each rendering tile in an embodiment has associated with it in some way, the set of primitive lists to be used for the tile. Other arrangements would, of course, be possible.

The information indicating which primitive lists are to be used for a given rendering tile can be provided in any suitable and desired form. In an embodiment, a set of pointers or indices to the relevant primitive lists is provided. In an embodiment, changes to the set of pointers or indices to the primitive lists are provided, to allow the system to identify and change the primitive lists that need to be changed when a new tile is to be rendered. Other arrangements would, of course, be possible.

The primitive generating and sorting process is in an embodiment able to index or add an index to the primitives, in an embodiment as they are included in the primitive lists, and this index is in an embodiment then used, e.g., by the primitive selection unit, to select the primitive to be processed next. The indexing is in an embodiment done by numbering the primitives consecutively, in an embodiment as they are included in the primitive lists. The index allocated to a primitive is in an embodiment only changed (e.g. (incremented) when the set of sub-regions (the hierarchy level) at which the primitive is being listed changes (i.e. differs to the set of sub-regions (the hierarchy level) for the preceding primitive).

Such indexing of the primitives as they are listed (binned) assists with the rendering process for a tile, as it will, e.g., facilitate rendering the primitives in the correct order. In particular, the (sorting) index given to each primitive can be used to select the next correct (desired) primitive for rendering, thereby allowing, e.g., the desired primitive order to be reconstructed when the primitives are to be rendered and helping to ensure that the primitives can be and are taken from the different primitive lists for rendering in the desired (correct) order (typically the order in which they are first generated).

A primitive list or lists in an embodiment can be and in an embodiment is or are cached by or in the graphics processor, in an embodiment by the primitive selection unit, i.e. the primitive lists can be and in an embodiment are stored in a local, more rapidly accessible memory of the graphics processor. Thus, the apparatus and method of the technology described herein in an embodiment include a step of caching or are configured to cache a primitive list or lists. Such caching can reduce bandwidth usage in respect of the primitive lists.

It should be noted here that although references herein to "primitives" are primarily intended to refer to graphics primitives in the form of "simple" polygons such as triangles, grids, lines or points, etc., (and, in an embodiment, do refer to graphics primitives in the form of "simple" polygons such as triangles, quads, lines or points), the technology described herein is also applicable to larger graphics objects or primitives, such as graphics components or primitives that are intended to represent larger objects in the scene and/or groups of smaller polygons (such as a group of contiguous triangles). For example, it may be desired to process and sort a group of plural individual polygons as a single graphical object or primitive. Such larger, "complex" primitives ("meta-primitives") can equally be listed for render output sub-regions in the manner of the technology described herein. Thus references herein to "primitives", etc., should, unless the context otherwise requires, be interpreted accordingly.

The technology described herein is applicable to any form or configuration of graphics processor and renderer, such as renderers having a "pipelined" arrangement (in which case the renderer will be in the form of a rendering pipeline). As will be appreciated from the above, the graphics processor and system is in an embodiment a tile-based graphics processor and system.

The graphics processor and pipeline can contain any suitable and desired processing stages, etc., that graphics processor and pipelines normally include. Thus, for example, it in an embodiment includes one or more of, and in an embodiment all of: a rasteriser, a renderer (in an embodiment in the form of a fragment shader), early and late depth and stencil testing stages (tester), a blender, a write-out unit, etc.

The graphics processor (and pipeline) in an embodiment also comprises a tile buffer for storing tile sample values and/or a write out unit that operates to write the data in the tile buffer (e.g. once the data in the tile buffer is complete) out to external (main) memory (e.g. to a frame buffer).

As well as the graphics processor (graphics processing pipeline), the overall graphics processing system that the graphics processor is part of in an embodiment includes a host processor, e.g., and in an embodiment, that executes applications that can require graphics processing by the graphics processor. The host processor will send appropriate commands and data to the graphics processor to control it to perform graphics processing operations and to produce graphics processing (render) output required by applications executing on the host processor (including in the manner of the technology described herein).

To facilitate this, the host processor should, and in an embodiment does, also execute a driver for the graphics processor and a compiler or compilers for compiling shader programs to be executed by programmable shading stages of the graphics processor (which compiler may be, and in an embodiment is, a part of the driver).

Thus, in an embodiment, the graphics processing system comprises a graphics processor that is in communication with a host microprocessor that executes the driver for the graphics processor and/or a compiler or compilers for the graphics processor. The graphics processor and/or the host microprocessor are in an embodiment also in communication with a display for displaying images generated by the graphics processor (thus in an embodiment the graphics processing system further comprises a display for displaying the images generated by the graphics processor).

In an embodiment, the various functions of the technology described herein are carried out by the graphics processor. However in other embodiments, at least some of the functions of the technology described herein may be performed by an external processing element such as a host processor, a CPU or MCU. In particular the step of determining a size of sub-regions to use when sorting primitives into lists based on a distribution of primitives across a render output may be performed by the host processor (e.g. a CPU or MCU). However the actual of sorting of primitives into lists representative of the various sub-regions may still be carried out by the graphics processor itself.

The various functions of the technology described herein can be carried out in any desired and suitable manner. For example, the functions of the technology described herein can be implemented in hardware or software, as desired. Thus, for example, the various functional elements of the technology described herein may comprise a suitable processor or processors, controller or controllers, functional units, circuitry, processing logic, microprocessor arrangements, etc., that are operable to perform the various functions, etc., such as appropriately dedicated hardware elements or processing circuitry and/or programmable hardware elements or processing circuitry that can be programmed to operate in the desired manner.

The various functional elements may be separate to each other or may share circuitry (e.g. be performed by the same processor and/or processing circuitry) as desired.

In an embodiment the apparatus of the technology described herein comprises dedicated (non-programmable) processing circuitry configured to operate in the manner described. In another embodiment, it comprises programmable processing circuitry that is programmed to operate in the manner described.

In an embodiment the functions of the technology described herein are carried out on a single graphics processing platform that generates and outputs the graphics data that is written as the render output (e.g. to the frame buffer for a display device).

In some embodiments, the data processing system, graphics processing system, data processors, graphics processors, processing circuitry, apparatus, etc., of the technology described herein may be in communication with memory and/or one or more memory devices that store the data described herein, such as the primitive data, the primitive distribution data, the primitive lists, etc., and/or that store software for performing the processes described herein. The data processing system, graphics processing system, data processors, graphics processors, processing circuitry, apparatus, etc., may also be in communication with a display for displaying images based on the primitive lists, etc.

It should also be noted here that, as will be appreciated by those skilled in the art, the various functions, etc., of the technology described herein may be duplicated and/or carried out in parallel on a given processor. There may be, for example, plural tiling units and/or primitive selection units operating in parallel.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or microprocessor system comprising data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

The technology described herein should (and in an embodiment does) produce some useful output data e.g. images may be displayed on a display based on the primitive lists, etc.

FIG. 1 shows schematically a graphics processing system that may be operated in accordance with the technology described herein. The graphics processing system includes a graphics processor 20 and a memory 23. The graphics processor 20 includes a geometry processor 21, and a renderer 22, both of which can access the memory 23. The memory 23 may be "on-chip" with the geometry processor 21 and renderer 22, or may be an external memory that can be accessed by the geometry processor 21 and renderer 22.

Figure 2:
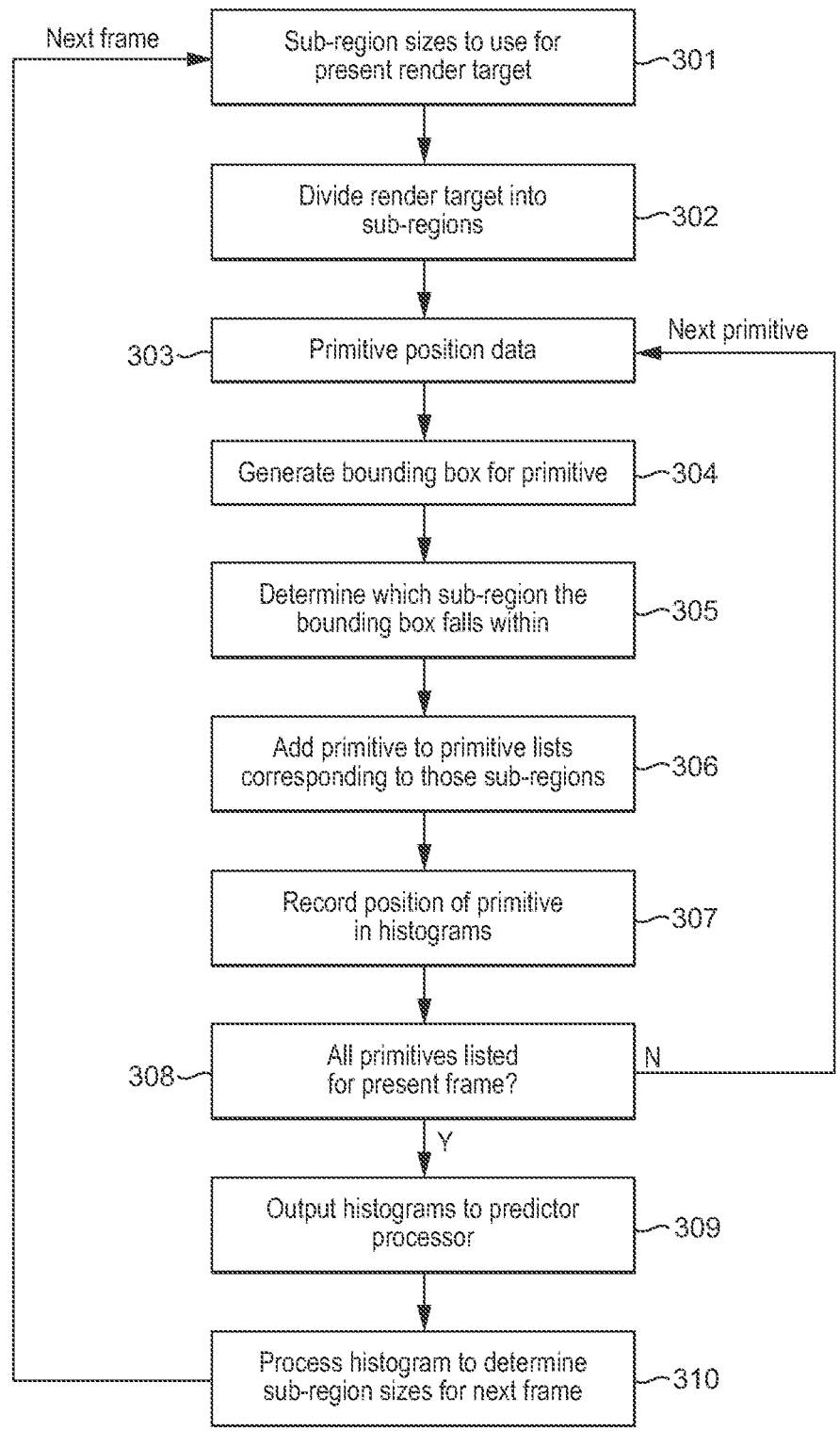
FIG. 2 shows a tiling flow process that is used by the graphics processor of FIG. 1.

The memory 23 stores, inter alia, and as shown in FIG. 2, a set of raw geometry data 24 (which is, for example, provided by the graphics processor driver or an API running on a host system (microprocessor) of the graphics processor 20), a set of transformed geometry data 25 (which is the result of various transformation and processing operations carried out on the raw geometry 24), and a set of primitive lists 26. The primitive lists 26 contain data, commands, etc., for the respective primitives, and are prepared in accordance with the technology described herein. This process will be described in more detail below.

The transformed geometry data 25 comprises, for example, transformed vertices (vertex data), etc.

The geometry processor 21 comprises, inter alia, a programmable vertex shader 27 and a tiler 40. The tiler comprises a primitive list building unit 41 and a predictor processor 42.

The programmable vertex shader 27 takes as it input the raw geometry data 24 stored in the memory 23, and processes that data to provide transformed geometry data 25 (which it then stores in the memory 23) comprising the geometry data in a form that is ready for 2D placement in the render output (e.g. frame to be displayed). The programmable vertex shader 27 and the processes it carries out can take any suitable form and be any suitable and desired such processes.

The primitive list building unit 41 of the tiler 40 carries out the process of the technology described herein of dividing the render target into a plurality of sub-regions for which primitive lists are to be prepared. The sizes of the sub-regions that the render target is divided into are determined according to sub-region size configuration information for the target render output being generated that is provided to the primitive list building unit 41 by the predictor processor 42.

Once the render output has been divided into various sub-regions (of various sizes), the primitive list building unit 41 begins allocating the primitives to the primitive lists corresponding to those sub-regions. To do this, the primitive list building unit 28 takes as its input the transformed and processed vertex (geometry) data 25 from the programmable vertex shader 27 (i.e. the positions of the primitives in the frame), builds primitive lists using that data, and stores those lists as the primitive lists 26 in the memory 23.

During the process of allocating primitives to primitive lists, the primitive list building unit 41 also uses the transformed and processed vertex (geometry) data 25 to progressively build a pair of histograms (for the x and y axes respectively) showing, respectively, the number of primitives projecting onto the x and y axes.

The processes by which the tiler allocates primitives to primitive lists, and by which it builds the histograms, will be explained in more detail below.

Once the primitive listing process is complete, and the histograms illustrating the distribution of primitives across the render target have been built, the histograms are provided to the predictor processor 42. The predictor processor 42 processes the histograms in order to determine a sub-region size configuration for the tiler to use when processing the next render output to be generated. This process will be explained in more detail below.

The renderer 22 includes a primitive selection unit 29, a primitive list cache 30, a vertex selection unit 31, a vertex data cache 32, a rasterising unit 33, a rendering unit 34, and tile buffers 35.

The rasterising unit 33, rendering unit 34, and tile buffers 35 operate, in this embodiment, in the usual manner for such units in graphics processing systems. Thus the rasterising unit 33 takes as its input a primitive and its vertices, rasterises the primitive to fragments, and provides those fragments to the rendering unit 34. The rendering unit 34 then performs a number of rendering processes, such as texture mapping, blending, shading, etc. on the fragments, and generates rendered fragment data which it stores in the tile buffers 35 for providing to an output render target, such as a frame buffer for a display.

The primitive selection unit 29 of the renderer 22 determines which primitive is to be rendered next. It does this by considering the primitive lists 26 stored in the memory 23, and selecting from one of those lists the next primitive to be rendered.

The primitive selection unit 29 can also place one or more primitive lists in a primitive list cache 30.

The primitive selection unit 29 provides the primitive that it has selected for rendering next to the vertex selection unit 31. In response to this, the vertex selection unit 31 retrieves the appropriate transformed vertex data for the primitive in question from the transformed geometry data 25 stored in the memory 23, and then provides the primitive (i.e. its transformed vertex data) to the rasterising unit 33 for processing. The vertex selection unit 31 can cache vertex data that it has retrieved from the memory 23 in the vertex data cache 32, if desired.

As discussed above, the rasterising unit 33 then rasterises the primitive to fragments, and provides those fragments to the rendering unit 34 for rendering. The rendering unit 34 performs a number of rendering processes, such as texture mapping, blending, shading, etc. on the fragments, to generate rendered fragment data for the fragments representing the primitive, and stores the rendered fragment data in the tile buffers 35 for providing to an output render target, such as a frame buffer for a display.

FIG. 2 shows a flow process implemented by the tiler in one embodiment of the technology described herein.

In step 301, the primitive list building unit 41 takes as its input sub-region size configuration information for the render target being that is being generated. This sub-region size configuration information is received from the predictor processor 42.

The primitive list building unit 41 then, in step 302, uses the sub-region size configuration information to divide the render target into a set of sub-regions. The size of each of the sub-regions is determined based on the sub-region size configuration information.

In step 303, the primitive list building unit 41 retrieves the transformed primitive position data from the programmable vertex shader 27 for a primitive to be processed. In step 304, the primitive list building unit 41 uses the transformed primitive position data to calculate a bounding box for the primitive.

In the present embodiment, the bounding box for each primitive is determined as a simple rectangle (although other arrangements would, of course, be possible).

The bounding box for a primitive can be generated in any desired and suitable manner. In the present embodiment, the input vertices for the primitive are sorted to find the extreme X and Y values of the primitive and an initial bounding box is calculated.

Then, in step 305, the primitive list building unit 41 determines which of the sub-regions (that the render target has been divided into) the bounding box for the primitive falls within (intersects). This process can be carried out in any suitable and desired manner. In the present embodiment, the bounding box for the primitive is compared to X and Y values for each of the sub-regions which the render target is divided into. As will be understood, depending on the size and position of the primitive and the sizes of the render output sub-regions that, the bounding box may fall in one or multiple sub-regions (or indeed may fall in no sub-regions at all).

Once it has been determined which sub-regions the bounding box for the primitive falls within (intersects), the primitive is added to primitive lists corresponding to each of those sub-regions (step 306).

In step 307, the primitive list building unit 41 records the primitive in a pair of histograms showing the number of primitives that project onto, respectively, the X and Y axes of the render output. This process can be carried out in any suitable and desired manner.

In an embodiment, the primitive is recorded for the histograms by comparing the extreme X values for the primitive against a set of x-value ranges and by comparing the extreme Y values for the primitive against a set of y-value ranges. The set of x-value ranges and the set of y-value ranges are representative of the X and Y axes respectively, and are used to build the histograms for the X and Y axes, respectively. The primitive is recorded (i.e. counted) for each x-value range and y-value range that it is determined to fall within. As more and more primitives for the render output are recorded in the x-value ranges and y-value ranges in this manner, the tiler is able to progressively build histograms that illustrate the distribution of primitives projecting onto the X and Y axes of the render target.

Figure 3A:
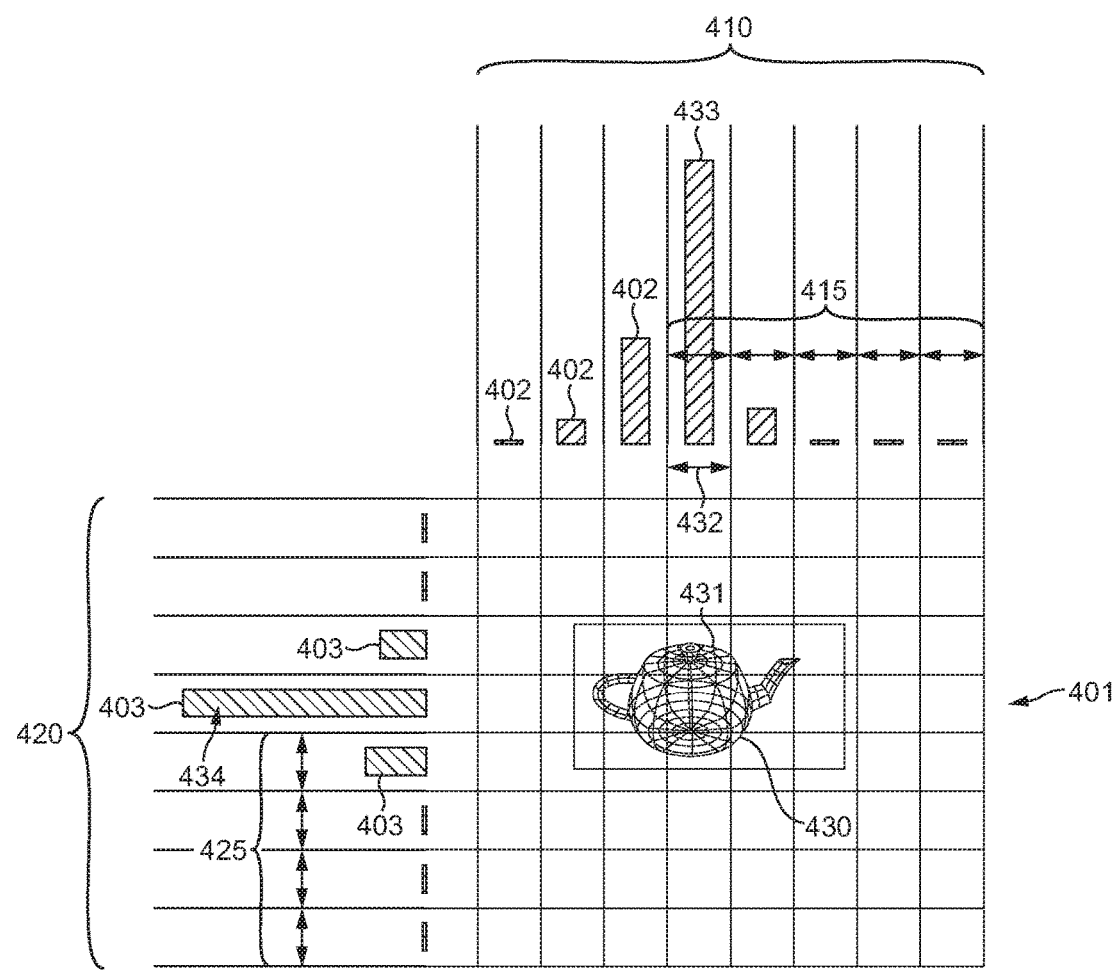
FIGS. 3A and 3B show a pair of histograms illustrating a distribution of primitives for a render output that are drawn up for a render output being generated and a method for using the same to determine a bin size configuration for a next render output to be generated, in accordance with one embodiment of the technology described herein.

FIG. 3A shows a representation of pair of histograms 410 and 420 that are built up for a render output 401 according to an embodiment. The render output 401 has an object 430 which comprises a high density of primitives.

Histogram 410 shows the distribution of primitives projecting onto the X axis of the render output 401. The histogram 410 is made up of a series of frequency density peaks 402 for a set of x-value ranges 415 that stretch over the X axis of the render output 401.

As described above, the histogram is built up by progressively recording primitives for the render output in the relevant x-value ranges 415. When a primitive is to be recorded, the tiler checks extreme X values for the primitive (or other such transformed vertex value data for the primitive) against the X values for the x-value ranges 415. The primitive is then recorded in the frequency density peak (or peaks) 402 of the histogram 401 that correspond to the x-value range (or x-value ranges) which the primitive is determined to fall within.

For example, it can be seen that a primitive 431, which is located entirely within x-value range 432, will be recorded in the frequency density peak 433 that corresponds to x-value range 432.

As more primitives for the render output 401 are processed in this manner, the tiler progressively builds the histogram 410. Once all of the primitives for the render output 401 have been recorded in this manner, the completed histogram 410 will illustrate the distribution of primitives projecting onto the X axis of the render output 401. (This is reflected in histogram 410 shown in FIG. 4A, which illustrates that there is a relatively high density of primitives projecting onto the middle of the X axis of the render output 401, and a relatively low density of primitives projecting onto the upper and lower portions of the X axis of the render output 401).

Histogram 420 shows a distribution of primitives projecting onto the Y axis of the render output 401. The histogram 420 for the Y axis is built up in a corresponding manner to histogram 410 for the X axis, i.e. by checking extreme Y values for primitives against Y values for a set of y-value ranges 425, and recording the primitives in corresponding frequency density peaks 403.

Returning now to FIG. 2, the process of listing primitives in primitive lists and recording their locations in the two histograms is repeated for each primitive of the render output (step 308).

Once all of the primitives have been recorded in the two histograms, the completed histograms (which now illustrate the entire distribution of primitives across the render output) are outputted by the primitive list building unit 41 to the predictor processor 42 (step 309). The predictor processor then processes the histograms to determine a sub-region size configuration to be used for the next render output to be generated (step 310). The tiling flow process is then repeated for the next render output to be generated (i.e. return to step 301).

(It should be noted here that, whilst in the present embodiment, the primitive list building unit 41 progressively determines the distribution of primitives for the render output by building two histograms, other means of determining a distribution of primitives across the render output are, of course, possible.)

The process of determining sub-region sizes to use for the next render output will now be described with reference to FIG. 3B.

Figure 3B:
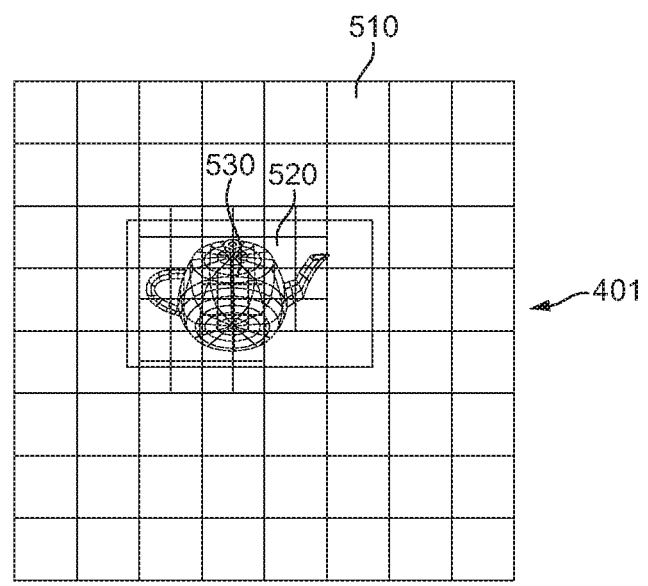

FIG. 3B shows a configuration of sub-region sizes for various sub-regions 510, 520, 530 that is determined based on the histograms 410 and 420 produced for (i.e. based on the distribution of primitives across) the render output 401. The render output 401 is shown in FIG. 4B overlaying the configuration of sub-region sizes for illustrative purposes. However it should be understood that, although the configuration of sub-region sizes is determined based on the distribution of primitives across render output 401, the configuration of sub-region sizes are actually used to divide up the next render output to be generated (i.e. the render output to be generated after render output 401), not the render output 401 itself.

In the embodiment shown in FIG. 4B, sub-regions may be configured to be one of three different sizes. As can be seen from FIG. 4B, the largest sub-region size is four times as big as the middle sub-region size, and sixteen times as big as the smallest sub-region size.

In the present embodiment, the predictor processor determines sub-region sizes to be used in various areas of the next render output to be generated based on the histogram frequency density peaks 402 and 403 for corresponding areas of the render output 401. In particular, the predictor processor chooses to use a larger sub-region size in areas that the histograms 410 and 420 indicate to have a lower density of (i.e. fewer) primitives in the corresponding area of render output 401, and chooses to use a smaller sub-region size in areas that the histograms 410 and 420 indicate to have a higher density of (i.e. more) primitives in the corresponding area of render output 401.

The choosing of sub-region sizes based on the histogram peaks can be carried out as desired. In the present embodiment, the predictor processor 42 chooses a sub-region size for a particular area of the next render output to be generated based on the distribution of primitives across the render output 401, based on the sizes of the frequency density peaks in the histograms 410 and 420 for the x and y values corresponding to that area of the render output 401.

In the present embodiment, the predictor processor 42 chooses to use a smaller sub-region size in a particular area of the render output to be generated if the product of the frequency density peaks in the histograms 410 and 420 for the x-value range and the y-value range corresponding to that area of the render output 401 is above a certain threshold. In other words, if the frequency density of primitives listed for the x-value range and the frequency density of primitives listed in the y-value range corresponding to the position of a particular area of the render output 401 are, when multiplied together, above a certain threshold, then the sub-region size for that corresponding area of the next render output to be generated is reduced.

For example, an area 530 is chosen to have a smaller (the smallest) sub-region size, because the product of the frequency density peaks 433 and 434 for the x and y values corresponding to the area 530 in histograms 410 and 420 is above a certain (the required) threshold.

Area 510, on the other hand, is chosen to have a larger (the largest) sub-region size, because the product of the frequency density peaks for the x and y values corresponding to the area 510 in histograms 410 and 420 is not above the required threshold.

As will be understood, the configuration of sub-region sizes shown in FIG. 3B (that is to be used when dividing a next render output to be generated) is determined based (solely) on the distribution of primitives across the previous render output 401 (i.e. the two histograms 410 and 420 generated for the render output 401).

However, in another embodiment, the configuration of sub-region sizes may be determined based upon the distributions of primitives across (e.g. the histograms generated for) multiple render outputs. In this way, the system is able to, in effect, predict a likely distribution of primitives for the render output to next be generated based on these (multiple) distributions for the multiple previously-generated render outputs which accounts for the movement of objects as time progresses in the scene being rendered. The system is then able to determine a configuration of sub-region sizes to be used for the next render output based on this predicted distribution.

Figure 4A:
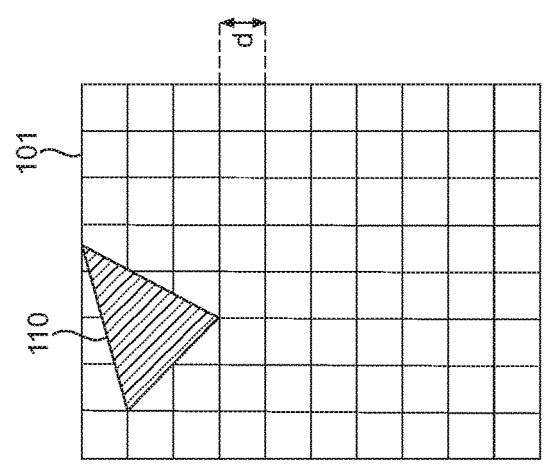
FIGS. 4A, 4B and 4C show a method for predicting a distribution of primitives in accordance with another embodiment of the technology described herein.
Figure 4B:
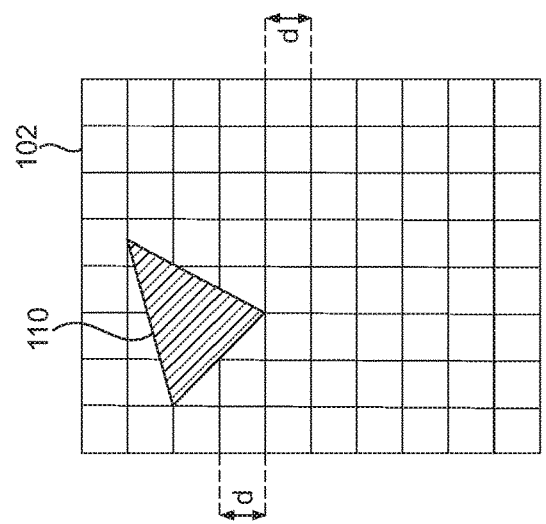
Figure 4C:
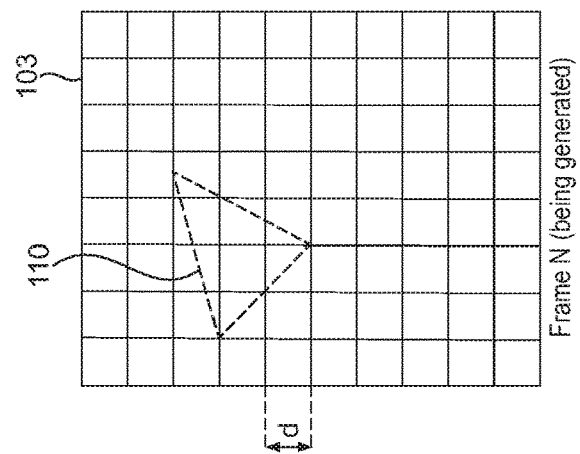

FIGS. 4A-C illustrate this principle. FIG. 4C shows a predicted distribution of primitives for a frame 103 that may be generated in accordance with an embodiment of the technology described herein. Frame 120 represents an Nth frame to be generated.

FIGS. 4A and 4B show the two frames 101 and 102 that were generated immediately prior to frame 103. These frames are, respectively, the (N−2)th and (N−1)th frames, that have already been generated.

FIGS. 4A and 4B each show a complex object 110 comprising a high density of primitives. As can be seen, the complex object has moved a distance d between frames 101 and 102 (in the downwards direction). Based on this determined difference in primitive distribution across these two frames that are immediately prior to the present frame being generated, the system is able to extrapolate and predict a new area of higher density of primitives 120 in the next frame to be generated 103 at a distance of d below the previous frame 102.

The predictor processor 42 is then able to choose a configuration of sub-region sizes for the Nth frame 120 based on the predicted distribution for that frame. (For example, the predictor processor is able to choose a smaller sub-region size for the area of predicted higher density of primitives 120 for the next frame 103 in the sub-region size configuration generated, as described above).

It will also be understood that, in the embodiment shown in FIG. 3B, a sub-region size configuration is produced (by the predictor processor 42) that comprises a single set of sub-regions of various sizes covering the entirety of the next render output to be generated. The sizes of the various sub-regions are chosen based on the distribution of primitives across the previous render output 401, and may be variable on an individual sub-region by sub-region basis. The sub-region size configuration is then used by the primitive list building unit 41 to divide the next render output into a single set of sub-regions of various sizes. (This is a so-called "flat" implementation of the technology described herein).

However in another embodiment (a so-called "hierarchical" implementation), wherein primitive lists may be prepared for plural different sets of (different sized) sub-regions covering a single render output to be generated, the sub-region size configuration that is generated by the predictor processor 42 may comprise information regarding which sets of sub-regions (i.e. which layers of the hierarchy) are to be enabled across the next render output to be generated. Such a hierarchal primitive list arrangement is described, e.g., in Applicant's earlier UK patent No. 2433014.

In these arrangements, the sub-region size configuration that is generated (by the predictor processor 42) may indicate which sets of sub-regions to enable across the entirety of the next render output to be generated. The system may choose which sets of sub-regions to enable across the entirety of the next render output to be generated based on the distribution of primitives across the previous render output 401. For example, the sub-region size configuration that is generated may indicate that lower level sets (i.e. sets of smaller sub-regions) should be enabled across the next render output to be generated, if it is predicted that there will be a relatively high distribution of primitives across at least one area of the next render output to be generated. Conversely, the sub-region size configuration that is generated may indicate that lower level sets should be disabled across the next render output to be generated, if it is predicted that not one area of the next render output to be generated will contain a relatively high distribution of primitives.

Correspondingly, the sub-region size configuration that is generated may indicate that higher level sets (i.e. sets of larger sub-regions) should be enabled across the next render output to be generated, if it is predicted that there will be a relatively low distribution of primitives across at least one area of the next render output to be generated. Conversely, the sub-region size configuration that is generated may indicate that lower level sets should be disabled across the next render output to be generated, if it is predicted that not one area of the next render output to be generated will contain a relatively high distribution of primitives.

The primitive list building unit 42 will then build primitive lists for (using) only those sub-regions which have been enabled according to sub-region size configuration determined by the predictor processor 42.

In another so-called "hierarchical" implementation, the sub-region size configuration that is generated by the predictor processor 42 may comprise information regarding which sets of sub-regions are to be enabled in various regions of the next render output to be generated.

For example, the sub-region size configuration that is generated may indicate that lower level sets (i.e. sets of smaller sub-regions) should be enabled (and, e.g. correspondingly, that higher level sets (i.e. sets of larger sub-regions) should be disabled) in an area wherein it is predicted that there will be a higher density of primitives in the next render output to be generated (e.g. area 530 shown in FIG. 3B). Correspondingly the sub-region size configuration information may indicate that higher level sets should be enabled (and correspondingly, that lower level sets should be disabled) in an area wherein it is predicted that there will be a lower density of primitives in the next render output to be generated (e.g. area 501 in FIG. 3B).

When building the various primitive lists (which may, as described above, correspond to a single set of sub-regions that the render output is divided into (in a so-called "flat" implementation), or alternatively correspond to various overlapping sets of sub-regions (in a so-called "hierarchical" implementation)), the primitive list building unit 28 places the primitives in the primitive lists 26 in the order that it receives the primitives from the programmable vertex shader 27. This means that, so far as each individual primitive list 26 is concerned, the primitives in the list are in the order that they were generated, which will typically correspond to the desired order of rendering the primitives. (When primitives are generated for rendering, they are usually generated by the host driver or API in the order that it is desired to render the primitives and are provided to the graphics processor in that order. Thus, as the primitive list building unit 28 takes the primitives in turn as they are received, it will place the primitives in the individual tile lists in rendering order so far as each individual primitive list is concerned.)

Once the primitive list building unit 28 has finished building the primitive lists 26 for the render output (e.g. frame) to be rendered, and stored those lists in the memory 23, the renderer 22 can then render the output (e.g. frame). This process will now be described.

In the present embodiment, the rendering process is performed on a rendering tile by rendering tile basis, i.e. each rendering tile 51 of the render output is rendered individually in turn, and the rendered tiles are combined to provide the overall render output (e.g. frame for display).

The renderer 22 is first provided with the identity of a rendering tile to be rendered.

If the render output has been divided up into a single set of sub-regions for which primitive lists have been prepared (i.e. a so-called "flat" implementation), then the renderer 22 reads the single primitive list of the plurality of primitive lists 26 that corresponds to the sub-region that covers the rendering tile in question.

If primitive lists have been prepared for multiple, overlapping sets of sub-regions (e.g. in a so-called "hierarchical" implementation, as described above), then, as will be understood, there may be multiple primitive lists corresponding to various sub-regions that each cover the rendering tile in question. If this is the case (i.e. if there are multiple primitive lists for the rendering tile in question), then the renderer 22 reads each of the primitive lists of the plurality of primitive lists that correspond to sub-regions that cover the rendering tile in question.

(In the present embodiment, the stored primitive lists that apply to the tile being rendered are indicated by including pointers to the relevant primitive lists in the "new tile" command that is sent when a tile is first to be rendered. (Other arrangements would, of course, be possible).

The primitive selection unit 29 then chooses a next primitive to be rendered for the primitive list or lists that have been read for the rendering tile in question. Once a primitive has been selected, the primitive selection unit 29 passes that primitive to the vertex selection unit 31. The vertex selection unit 31 then retrieves the appropriate transformed geometry data for the vertices of the primitive in question from the transformed geometry data 25 stored in the memory 23, and provides that data to the rasterising unit 33. The primitive is then rasterised and rendered, and the resulting rendered primitive data stored appropriately in the tile buffers 35.

This process is repeated for all the primitives that need to be rendered for a given rendering tile (i.e. that are included in primitive lists 26 appropriate to the tile) until all the primitives for the tile have been rendered (and so the tile buffers contain all the rendered data for the tile in question). The rendered tile data can then be written out (exported) to external memory, such as a frame buffer in main memory (not shown).

The renderer 22 then renders the next rendering tile in the same manner, and so on, until all the individual rendering tiles for the render output have been rendered (and written out to external memory, such as a frame buffer).

Once all the tiles for the render output have been rendered, the combined set of rendered tiles may then be provided as the render output, e.g., to a display device for display. The process is then repeated for the next render output (e.g. frame) to be generated, and so on.

As discussed above, the renderer 22 also includes a primitive list cache 30 and a vertex data cache 32.

Although these caches are shown separately for illustration purposes in FIG. 2, in practice the primitive lists and vertex data may be cached in the general purpose L2 cache of the graphics processor.

The primitive selection unit 29 is configured to store in the primitive list cache 30 one or more primitive lists 26 that it has read from the main memory 23. In particular, the primitive selection unit 29 in an embodiment retrieves from the memory 23 and stores in the primitive list cache 30 primitive lists that apply to sub-regions sized such that they comprise more than one rendering tile that, for example, the primitive selection unit 29 knows it will require for subsequent rendering tiles. This helps to avoid delays and latency due to the primitive selection unit 29 having to retrieve repeatedly from the memory 23 primitive lists that it will require for plural rendering tiles.

The vertex selection unit 31 can similarly cache vertex data that it retrieves from the transformed geometry data 25 in the memory 23 in the vertex data cache 32, again in particular where it can be identified that the vertex data will be required for a primitive again (for example because it is known that the primitive is listed for a render output sub-region that is sized such that it encompasses plural rendering tiles).

The order that the rendering tiles of the render output are processed by the renderer 22 can be selected as desired. However, in an embodiment, the tiles are processed in Morton or a similar order, as this facilitates, for example, the more efficient caching of primitive lists and vertex data in the renderer 22.

It can be seen from the above that the technology described herein comprises a method and system for sorting primitives into lists representing different sub-regions of a render output being generated that can reduce the total number of writes to and/or reads from the set of primitive lists, thereby, e.g. reducing memory bandwidth and/or power consumption when creating and then using the primitive lists.

This is achieved, in embodiments of the technology described herein at least, by determining the distribution of primitives across a render output when primitives to be processed for that render output are sorted into primitive lists. This determined distribution of primitives is then used to determine sizes of sub-regions to use when sorting primitives to be processed into lists for a next render output to be generated.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of generating a render output in a graphics processing system, comprising:
   preparing, by primitive list processing circuitry, lists of graphics primitives for rendering for different sub-regions of a first render output to be generated in the graphics processing system, each list indicating primitives to be processed for the respective sub-region of the render output, the preparing the lists of graphics primitives for different sub-regions of the first render output comprising:
     determining, by predictor processing circuitry, an area of at least one of the sub-regions of the first render output to be used when preparing the lists of primitives to be processed for the first render output based on a distribution of primitives across the area of another render output generated by the graphics processing system;
   the method further comprising:
   generating, by render output generating circuitry, the first render output using the primitive lists prepared for the different sub-regions of the first render output;
   wherein the step of determining an area of at least one of the sub-regions of a first render output to be used when preparing lists of primitives to be processed for the first render output based on a distribution of primitives across another render output comprises at least one of:
     (i) predicting a region of higher density of primitives in the first render output based on the distribution of primitives across the another render output; and
     determining a smaller area for sub-regions in the predicted region of higher density of primitives in the first render output to be used when preparing lists of primitives to be processed for the first render output; and
     (ii) predicting a region of lower density of primitives in the first render output based on the distribution of primitives across the another render output; and
     determining a larger area for sub-regions in the predicted region of lower density of primitives in the first render output to be used when preparing lists of primitives to be processed for the first render output.

2. The method of claim 1, wherein the graphics processing system is a tile-based graphics processing system and a render output to be generated by the graphics processing system is divided into plural rendering tiles for rendering purposes.

3. The method of claim 1, further comprising determining the distribution of primitives across the another render output.

4. The method of claim 1, wherein the another render output is the last render output to be generated by the graphics processing system prior to generating the first render output.

5. The method of claim 1, wherein primitive lists indicating primitives to be processed for a render output are prepared for each sub-region of a single set of sub-regions covering the entirety of the render output to be generated; and
   wherein the step of determining an area of at least one of the sub-regions of a first render output to be used when preparing lists of primitives to be processed for the first render output based on a distribution of primitives across another render output generated by the graphics processing system comprises determining an area of at least one of the sub-regions of the single set of sub-regions.

6. The method of claim 1, wherein primitives lists indicating primitives to be processed for a render output being generated can be prepared for each sub-region of a plurality of sets of sub-regions, each set of sub-regions covering the entirety of the render output to be generated;
   wherein the step of determining an area of at least one of the sub-regions of the first render output to be used when preparing lists of primitives to be processed for the first render output based on a distribution of primitives across another render output further comprises:
   selecting at least one set of the plurality of sets of sub-regions to be used when preparing lists of primitives to be processed for the first render output based on a distribution of primitives across another render output.

7. The method of claim 1, further comprising determining a distribution of primitives across the first render output while preparing lists of primitives to be processed for the first render output.

8. The method of claim 1, comprising:
   determining a distribution of primitives across a render output comprises determining, for a plurality of different regions of the render output, the number of primitives contained within those regions of the render output.

9. The method of claim 1, comprising:
   determining a distribution of primitives across a render output at a resolution which is determined based on the distribution of primitives across another render output.

10. A graphics processing system comprising:
    primitive list processing circuitry configured to prepare lists of primitives for rendering representing different sub-regions of a render output to be generated by the graphics processing system, each list indicating primitives to be processed for the respective sub-region of the render output;
    predictor processing circuitry configured to determine an area of at least one of the sub-regions of a render output for the primitive list processing circuitry to use when preparing lists of primitives to be processed for a first render output, based on a distribution of primitives across the area of another render output generated by the graphics processing system; and
    render output generating circuitry configured to generate a render output using the primitive lists prepared for sub-regions of a render output by the primitive list processing circuitry;
    wherein the predictor processing circuitry is configured to determine an area of at least one of the sub-regions of a first render output to be used by the primitive list processing circuitry when preparing lists of primitives to be processed for the first render output based on a distribution of primitives across another output by at least one of:
(i) predicting a region of higher density of primitives in the first render output based on the distribution of primitives across the another render output; and
determining a smaller area for sub-regions in the predicted region of higher density of primitives in the first render output to be used when preparing lists of primitives to be processed for the first render output; and
(ii) predicting a region of lower density of primitives in the first render output based on the distribution of primitives across the another render output; and
determining a larger area for sub-regions in the predicted region of lower density of primitives in the first render output to be used when preparing lists of primitives to be processed for the first render output.

11. The graphics processing system of claim 10, wherein the primitive list processing circuitry is configured to prepare primitive lists indicating primitives to be processed for a render output to be generated for each sub-region of a single set of sub-regions covering the entirety of the render output to be generated; and
wherein the predictor processing circuitry is configured to determine an area of at least one of the sub-regions of the single set of sub-regions.

12. The graphics processing system of claim 10, wherein the primitive list processing circuitry is configured to be able to prepare primitives lists indicating primitives to be processed for a render output being generated for each sub-region of a plurality of sets of sub-regions, each set of sub-regions covering the entirety of the render output to be generated; and
wherein the predictor processing circuitry is configured to determine an area of at least one of the sub-regions of the first render output for the primitive list processing circuitry to use when preparing lists of primitives to be processed for the first render output based on a distribution of primitives across another render output by selecting at least one set of the plurality of sets of sub-regions for the primitive list processing circuitry to use when preparing lists of primitives to be processed for the first render output into lists based on a distribution of primitives across another render output.

13. The graphics processing system of claim 10, wherein the primitive list processing circuitry is further configured to determine a distribution of primitives across the first render output while preparing lists of primitives to be processed for the first render output.

14. The graphics processing system of claim 10, wherein the primitive list processing circuitry is configured to determine the distribution of primitives across a render output at a resolution which is determined based on the distribution of primitives across another render output.

15. A method of generating a render output in a graphics processing system, comprising:
preparing, by primitive list processing circuitry, lists of graphics primitives for rendering for different sub-regions of a render output to be generated in the graphics processing system, each list indicating primitives to be processed for the respective sub-region of the render output, the preparing the lists of graphics primitives for different sub-regions of the render output comprising:
determining, by distribution determining circuitry, a distribution of primitives across the area of the render output being generated; and determining, by predictor processing circuitry, an area of at least one of the sub-regions of the render output to be used when preparing lists of primitives to be processed for the render output based on the determined distribution of primitives across the area of the render output;
the method further comprising:
generating, by render output generating circuitry, the render output using the primitive lists prepared for the different sub-regions of the render output,
wherein the step of determining an area of at least one of the sub-regions of the render output to be used when preparing lists of primitives to be processed for the render output based on a distribution of primitives across the area of the render output comprises at least of:
(i) predicting a region of higher density of primitives in the render output based on the distribution of primitives across the area of the render output; and
determining a smaller area for sub-regions in the predicted region of higher density of primitives in the render output to be used when preparing lists of primitives to be processed for the render output; and
(ii) predicting a region of lower density of primitives in the render output based on the distribution of primitives across the area of the render output; and
determining a larger area for sub-regions in the predicted region of lower density of primitives in the render output of be used when preparing lists of primitives to be processed for the render output.

16. A non-transitory computer readable storage medium storing computer software code which when executing on a processor performs a method of preparing lists of graphics primitives for rendering representing different sub-regions of a render output to be generated in a graphics processing system, each list indicating primitives to be processed for the respective sub-region of the render output, the method comprising:
determining an area of at least one of the sub-regions of a first render output to be used when preparing lists of primitives to be processed for the first render output based on a distribution of primitives across the area of another render output generated by the graphics processing system;
wherein the step of determining an area of at least one of the sub-regions of a render output to be used when preparing lists of primitives to be processed for the first render output based on a distribution of primitives across another render output comprises at least one of:
(i) predicting a region of higher density of primitives in the first render output based on the distribution of primitives across the another render output; and
determining a smaller area for sub-regions in the predicted region of higher density of primitives in the first render output to be used when preparing lists of primitives to be processed for the first render output; and
(ii) predicting a region of lower density of primitives in the first render output based on the distribution of primitives across the another render output; and
determining a larger area for sub-regions in the predicted region of lower density of primitives in the first render output to be used when preparing lists of primitives to be processed for the first render output.

\* \* \* \* \*